Dec. 9, 1952 G. E. FLINN 2,620,667
TRANSMISSION
Filed June 18, 1945 10 Sheets-Sheet 1

Inventor:
George E. Flinn
By Edward (signature)
Atty.

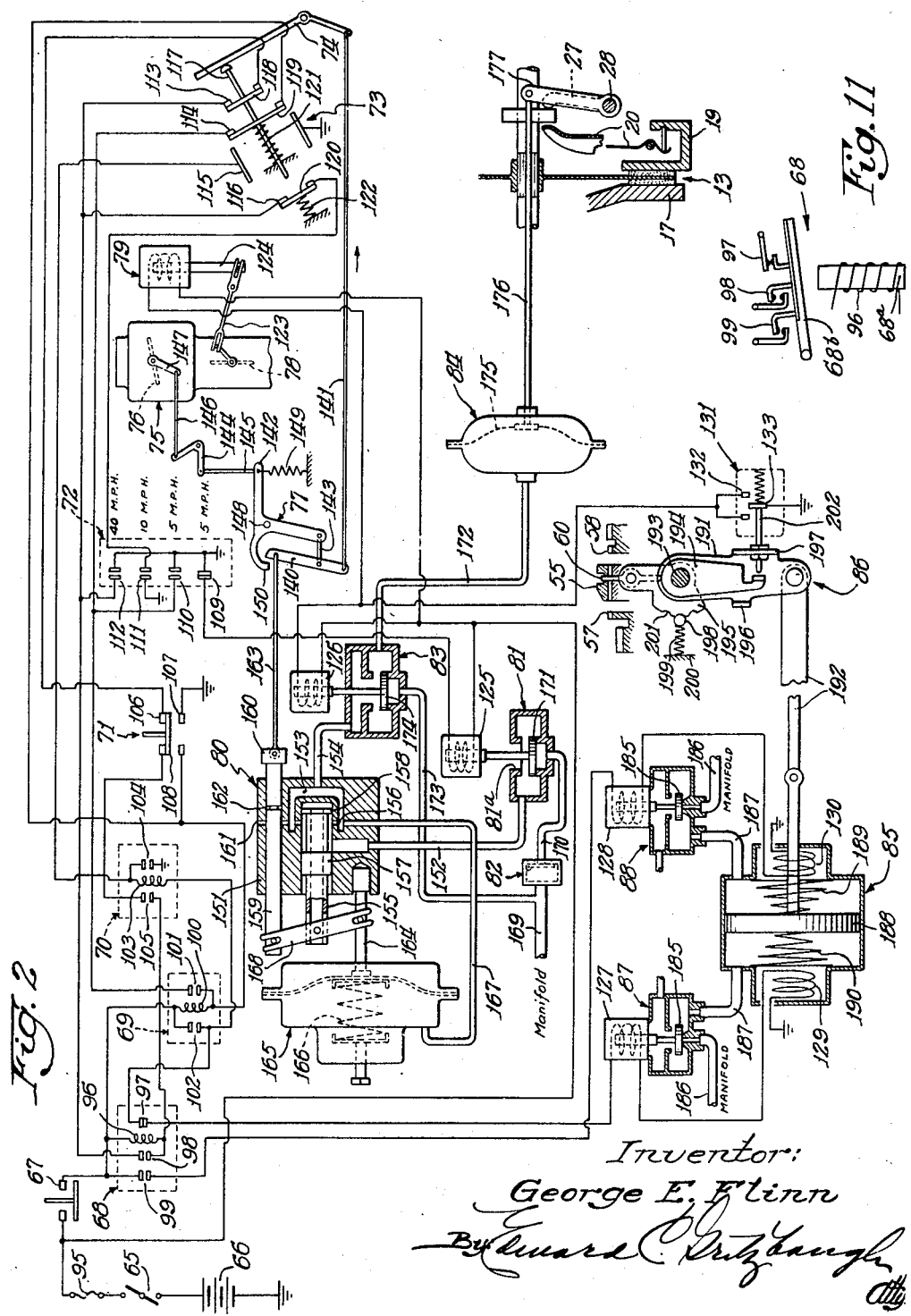

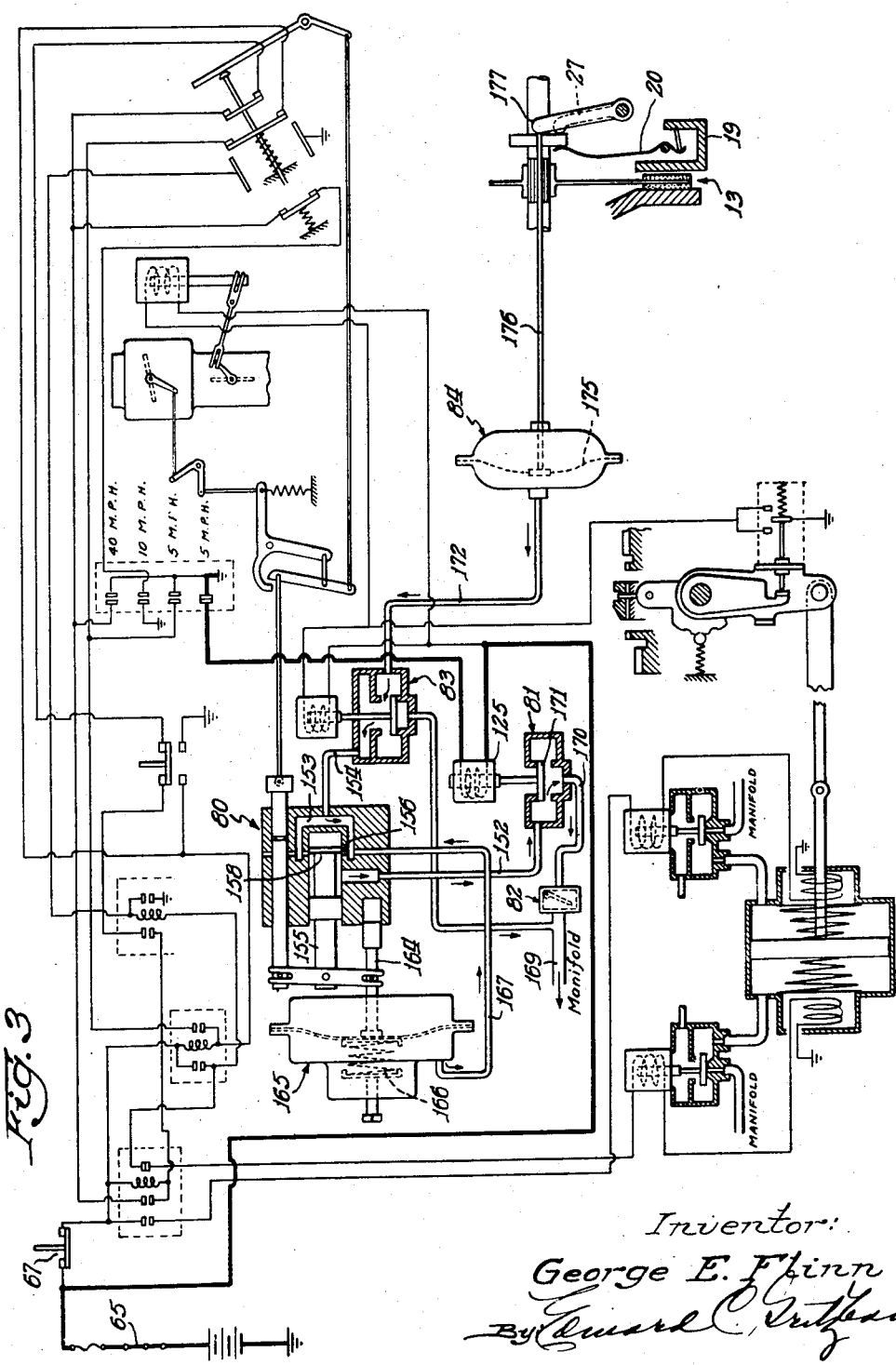

Dec. 9, 1952 G. E. FLINN 2,620,667
TRANSMISSION
Filed June 18, 1945 10 Sheets-Sheet 4
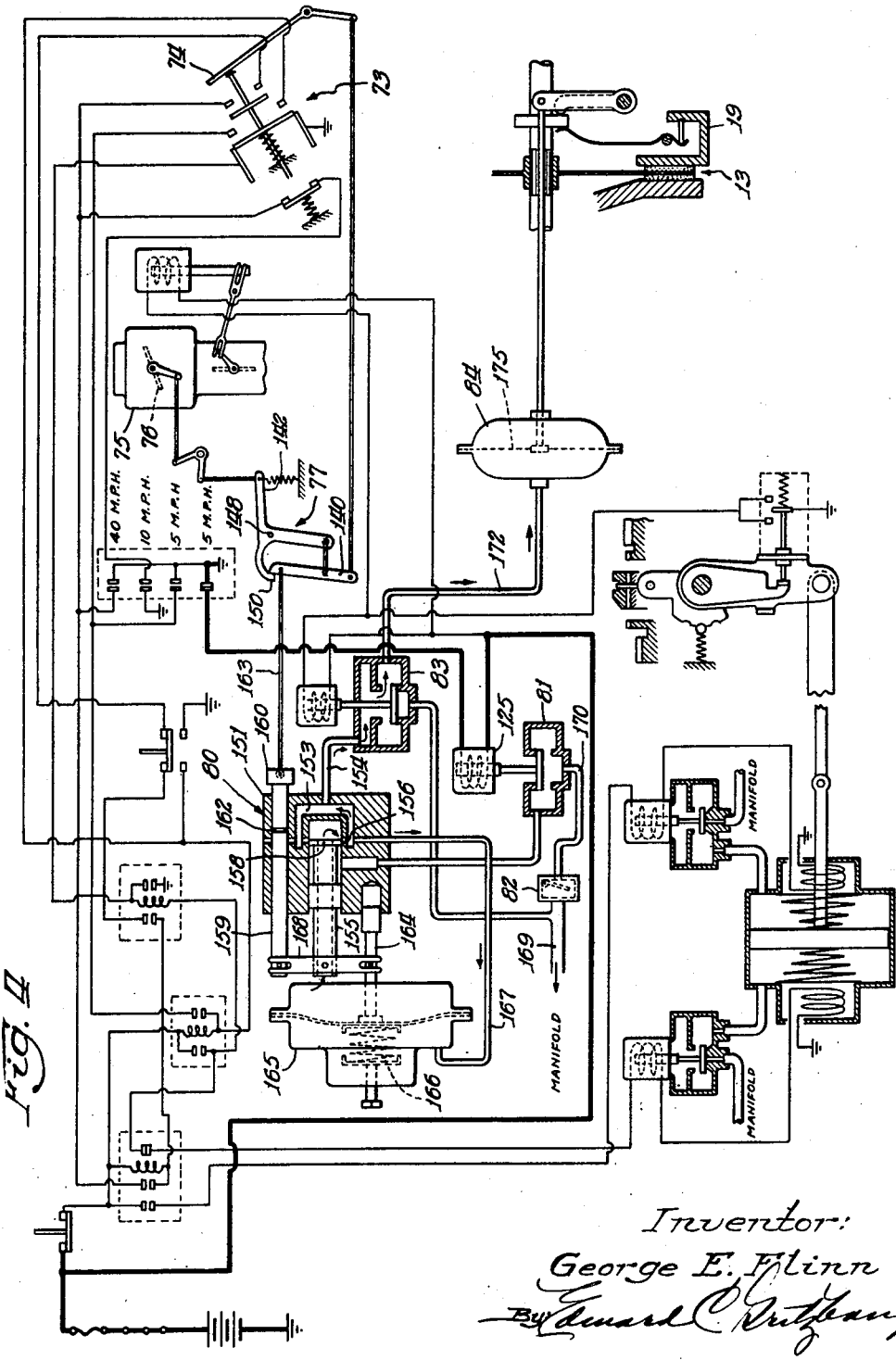
Inventor:
George E. Flinn

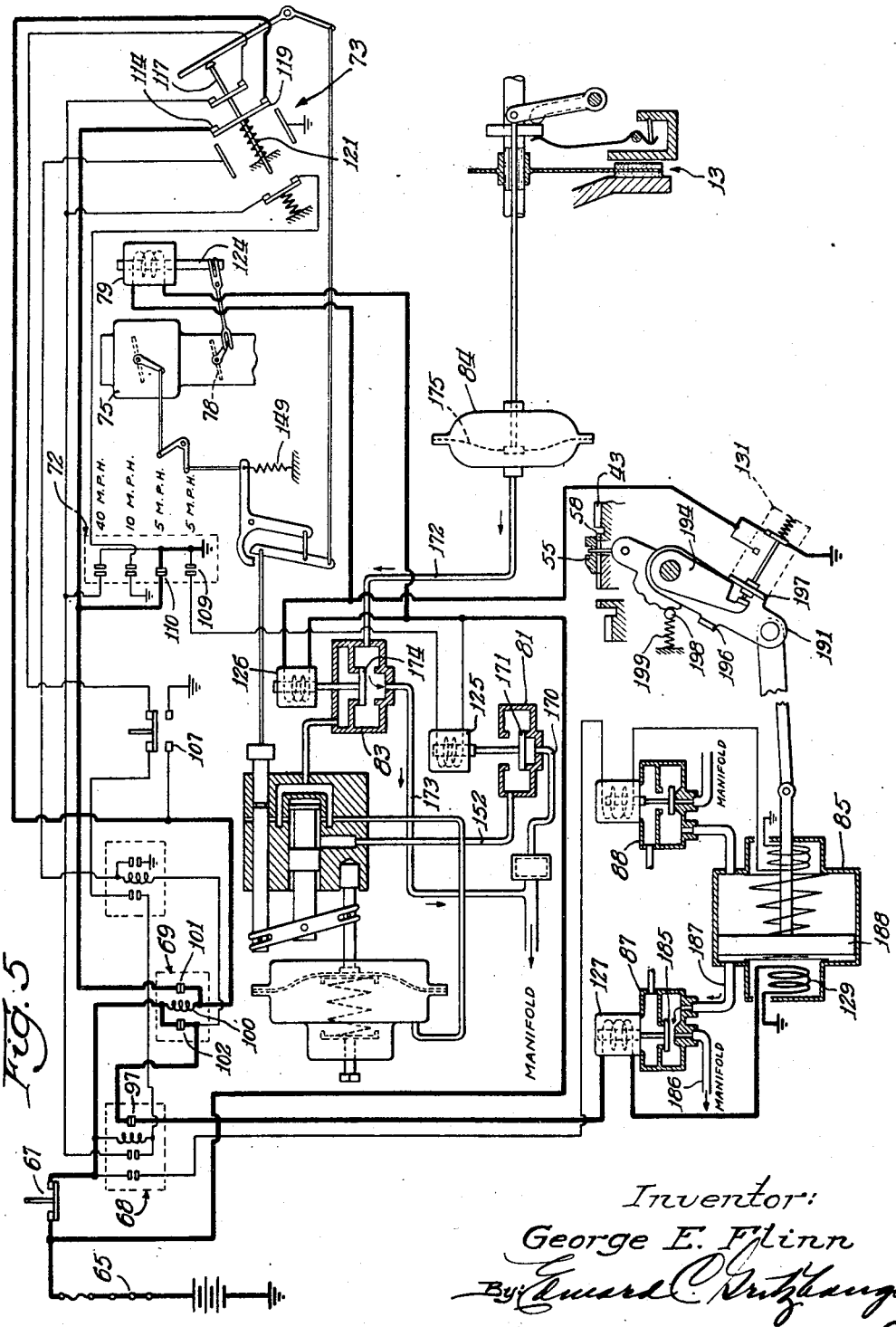

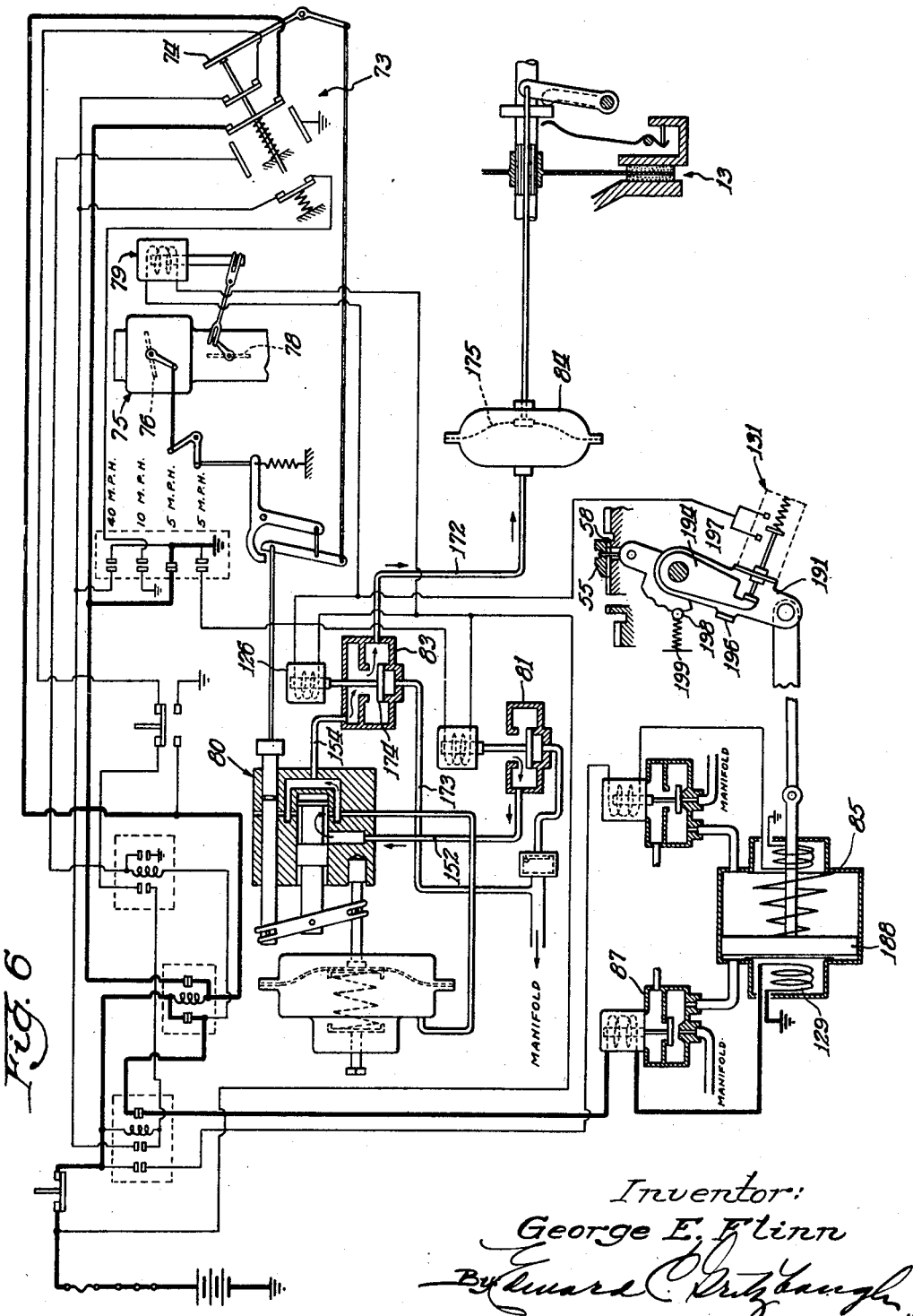

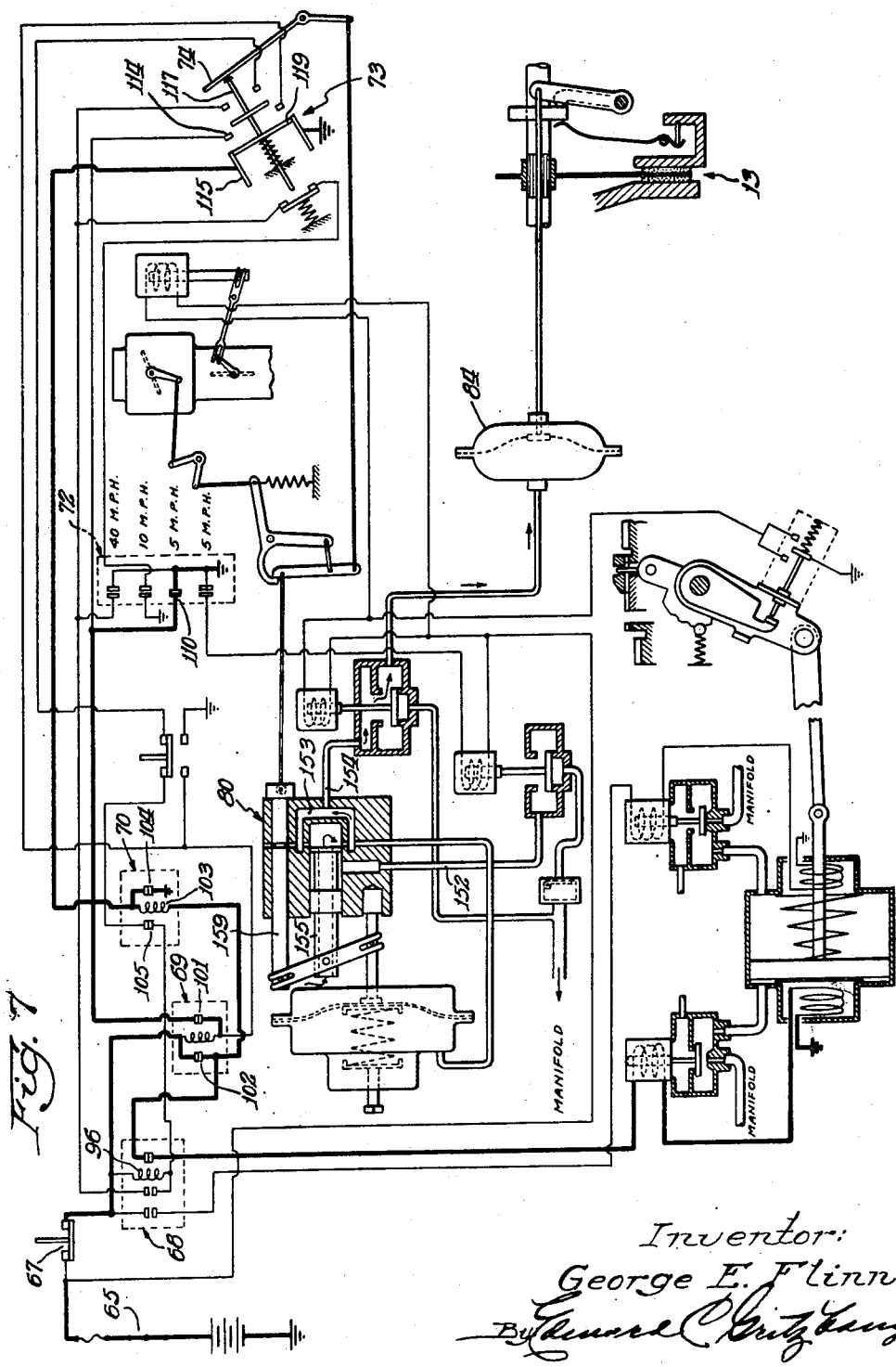

Dec. 9, 1952        G. E. FLINN        2,620,667
TRANSMISSION
Filed June 18, 1945        10 Sheets-Sheet 8
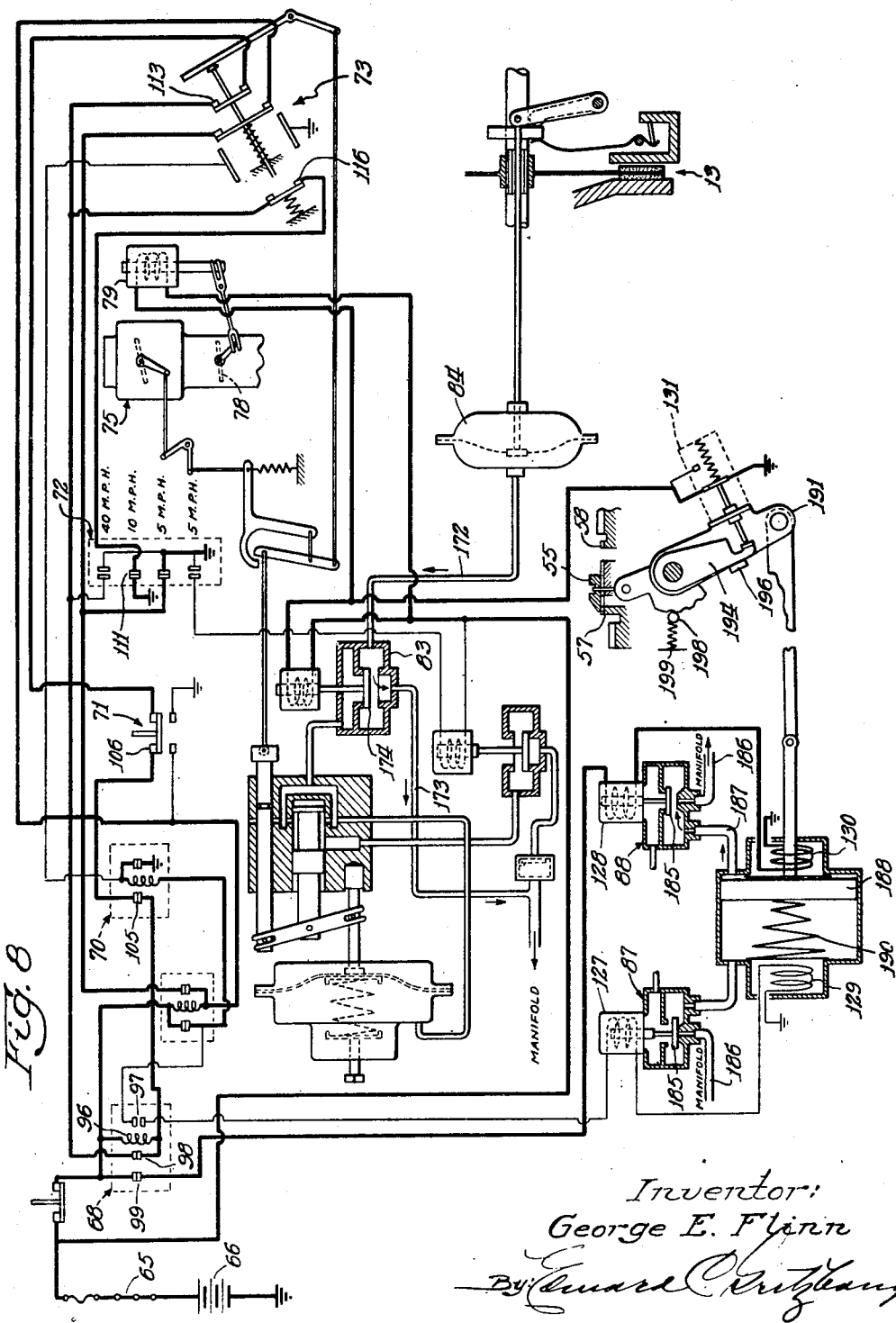
Inventor:
George E. Flinn

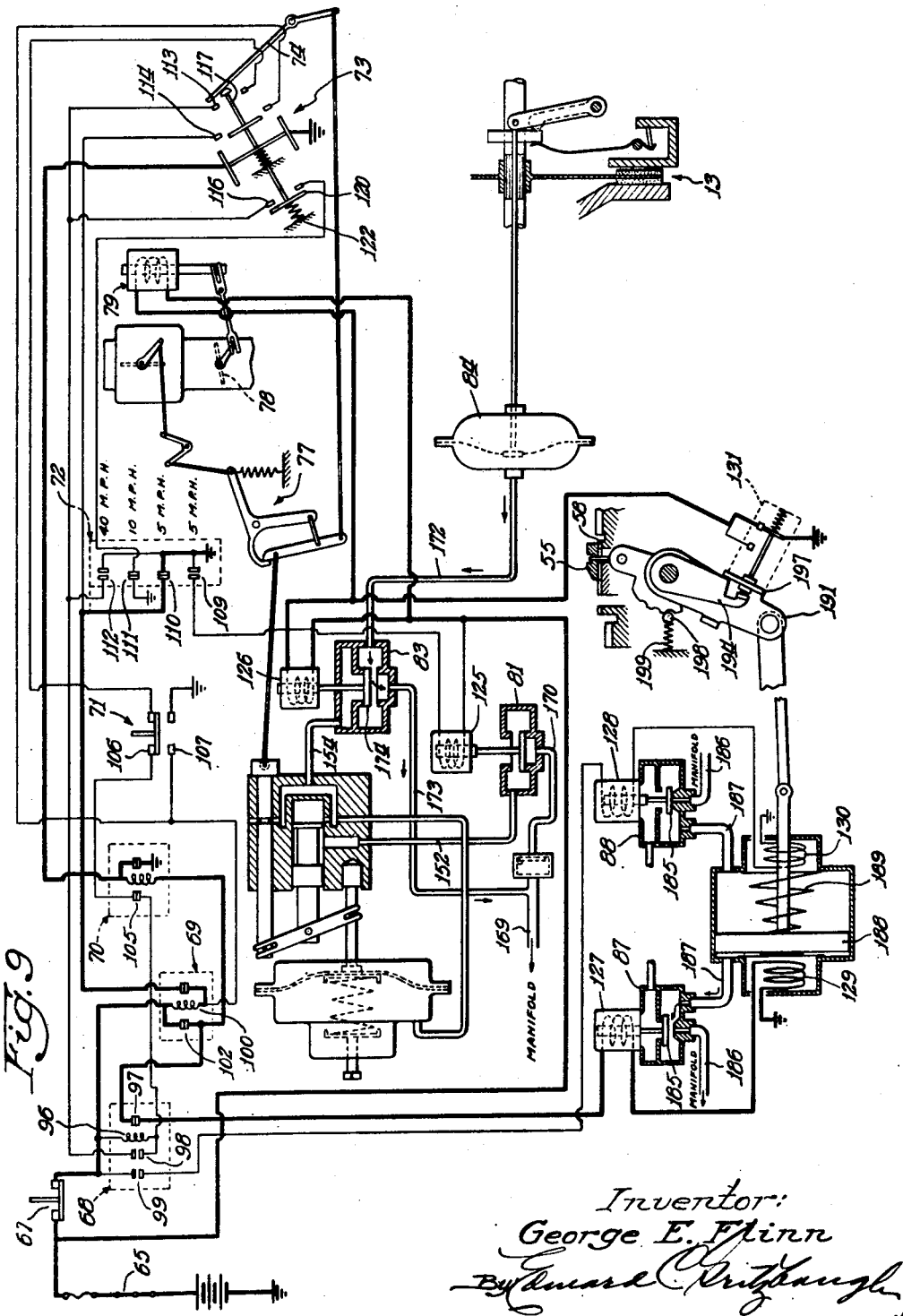

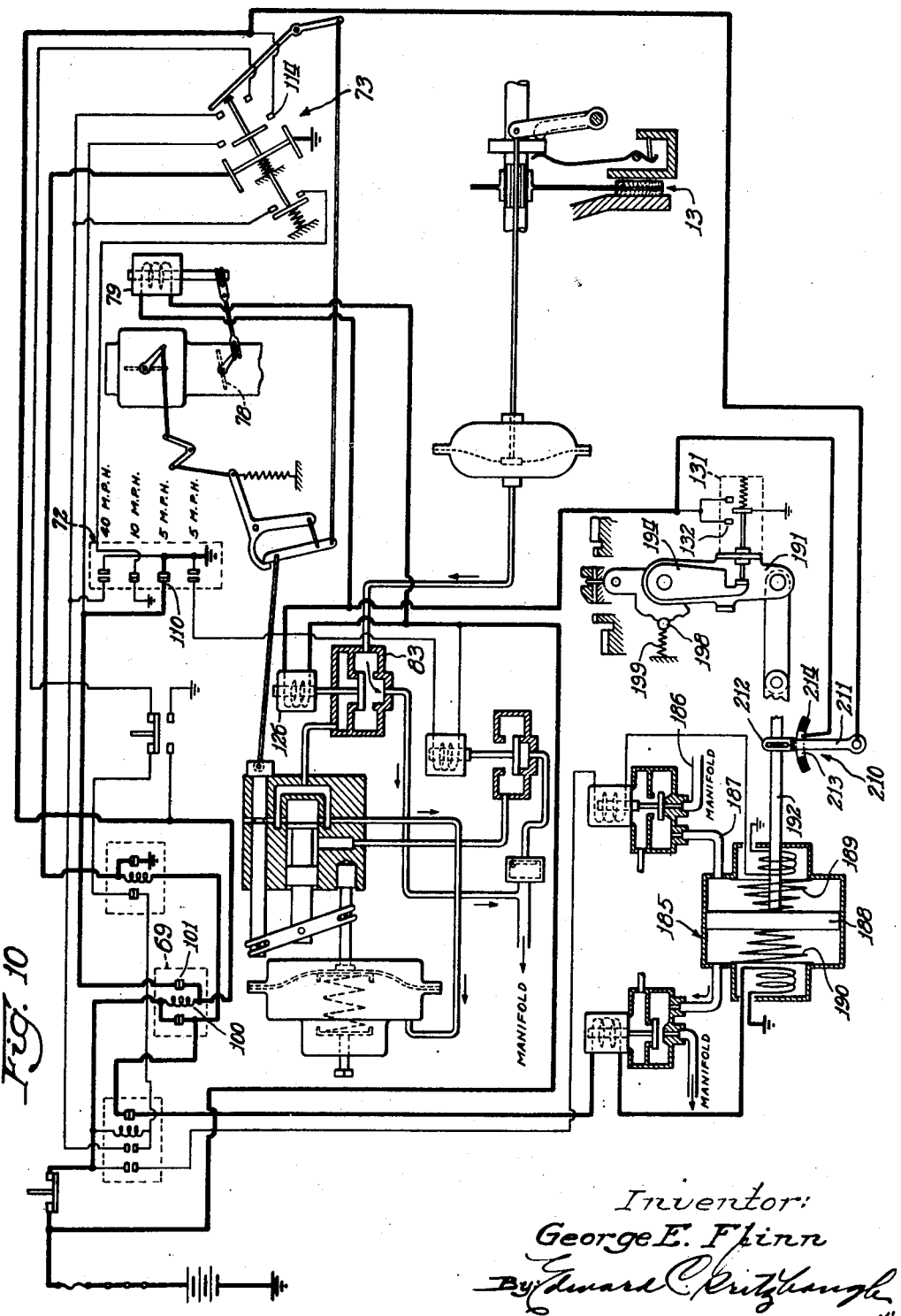

Patented Dec. 9, 1952

2,620,667

UNITED STATES PATENT OFFICE 2,620,667

TRANSMISSION

George E. Flinn, Muncie, Ind., assignor to Borg-Warner Corporation, Chicago, Ill., a corporation of Illinois Application June 18, 1945, Serial No. 599,993

35 Claims. (Cl. 74—472)

My invention relates to transmissions for automotive vehicles and more particularly to control mechanisms for such transmissions. Still more particularly my invention relates to such transmission control mechanisms which are under the control of the accelerator of the vehicle.

It is an object of my invention to provide a transmission having three forward speed ratios and an accelerator controlled transmission control mechanism by means of which the transmission may be shifted progressively from first to second to third speed ratios but not directly from first to third speed ratios.

It is a further object of the invention to provide an improved transmission control mechanism wherein a clutch between the engine of the vehicle and the transmission is disengaged and the throttle of the engine is put into engine idling condition automatically when a shift is made, and more particularly it is an object to provide such a mechanism wherein the shift is completed after once being initiated by means of the accelerator regardless of the subsequent movement of the accelerator after the shift has been initiated. To this end it is an object to provide a motor for making the shift of the transmission and which operates on an electric switch when the motor is operative, with the electric switch being connected with the engine idling means and the clutch disengaging means for rendering them operative. It is contemplated that the motor for making the shift shall preferably be of the vacuum type and shall be such as to make a portion of the shift while ball and detent means are provided for making the remainder of a shift movement. The switch connected with the vacuum motor shall then be in changed electrical condition only while the vacuum motor is effective to make its portion of the shift and prior to a completion of the shift by the ball and detent means. In connection with forcing the shift, it is an object to provide electric relays in connection with the accelerator which are so arranged that when once energized by movement of the accelerator, the relays remain energized even though the accelerator is moved prior to a completing of the shift.

It is another object of my invention to provide a governor in the transmission controlling mechanism whereby the transmission can only be upshifted from first to second speed ratio above a predetermined speed of the driven shaft of the transmission and of the vehicle and from second to third speed ratio only above a predetermined higher speed of the driven shaft and vehicle. It is a further object to provide a governor connection in the control mechanism whereby the transmission cannot be downshifted below a predetermined speed of the driven shaft and of the vehicle whereby to avoid excessive speeds of the engine.

It is also the object of my invention to provide a clutch engaging mechanism under the control of the accelerator which operates to engage the clutch when the accelerator is moved toward open throttle position, and it is an object to provide such a mechanism connecting the accelerator and clutch whereby the accelerator may not be utilized for disengaging the clutch below a predetermined speed of the driven shaft and of the vehicle.

It is another object of the invention to provide a coast switch in a transmission controlling mechanism which functions to put the transmission in a reduced gear speed ratio and prevents the shifting out of the reduced speed ratio regardless of how the accelerator is operated whereby the engine of the vehicle may be used as a brake in descending steep grades.

In certain embodiments of the invention comprising a vacuum motor of the piston type having spring means therein for returning the piston of the motor to neutral position, the motor being connected to shift the transmission, it has been found that the spring means acts more quickly than the vacuum can be utilized for moving the piston whereby the switch connected with the piston for disengaging the clutch and closing the engine throttle is not held in the same changed electrical condition to maintain the clutch disengaged and the throttle closed for the complete shift movement of the piston. It is thus another object of the invention to provide another switch actuated by the motor which is effective when the mechanism is conditioned for shifting from either second speed ratio to third speed ratio or vice versa for maintaining the clutch disengaged and the throttle closed throughout the complete movement of the vacuum piston regardless of this action of the spring means.

The invention disclosed and claimed in this application is similar in some respects to the inventions disclosed and claimed in the application of John M. Simpson, George E. Flinn, and Carl W. Osborne, Serial No. 599,992, filed June 18, 1945, and the application of Palmer Orr and George E. Flinn, Serial No. 599,994, filed June 18, 1945.

The invention consists of the novel constructions, arrangements and devices to be hereinafter described and claimed for carrying out the above stated objects and such other objects as will appear from the following description of certain preferred embodiments illustrated in the accompanying drawings, wherein:

Fig. 2 is a diagrammatic illustration of the control mechanism for the transmission shown in Fig. 1, the ignition switch for the vehicle being open and the accelerator being in closed throttle position;

Fig. 3 is a view similar to Fig. 2 but with the ignition switch being closed and with the vehicle engine being in operation to supply a vacuum;

Fig. 4 is a view similar to Fig. 3 but with the accelerator being partially depressed, the transmission itself having been preliminarily conditioned for low speed forward drive;

Fig. 5 is a view similar to Fig. 4 but with the vehicle traveling above five miles per hour and with the accelerator released to initiate a shift of the transmission from low to second speed ratios;

Fig. 6 is a view similar to Fig. 5 but after a shift from first speed ratio to second speed ratio has taken place, with the accelerator still released;

Fig. 7 is view similar to Fig. 6 but with the accelerator depressed after the shift from first to second speed ratios has taken place;

Fig. 8 is a view similar to Fig. 7 but with the vehicle travelling above ten miles per hour and with the accelerator released to cause a shift from second speed ratio to high speed ratio;

Fig. 9 is a view similar to Fig. 8 but with the shift to high speed ratio completed and with the accelerator depressed to cause a downshift from third speed ratio to second speed ratio;

Figure 1:
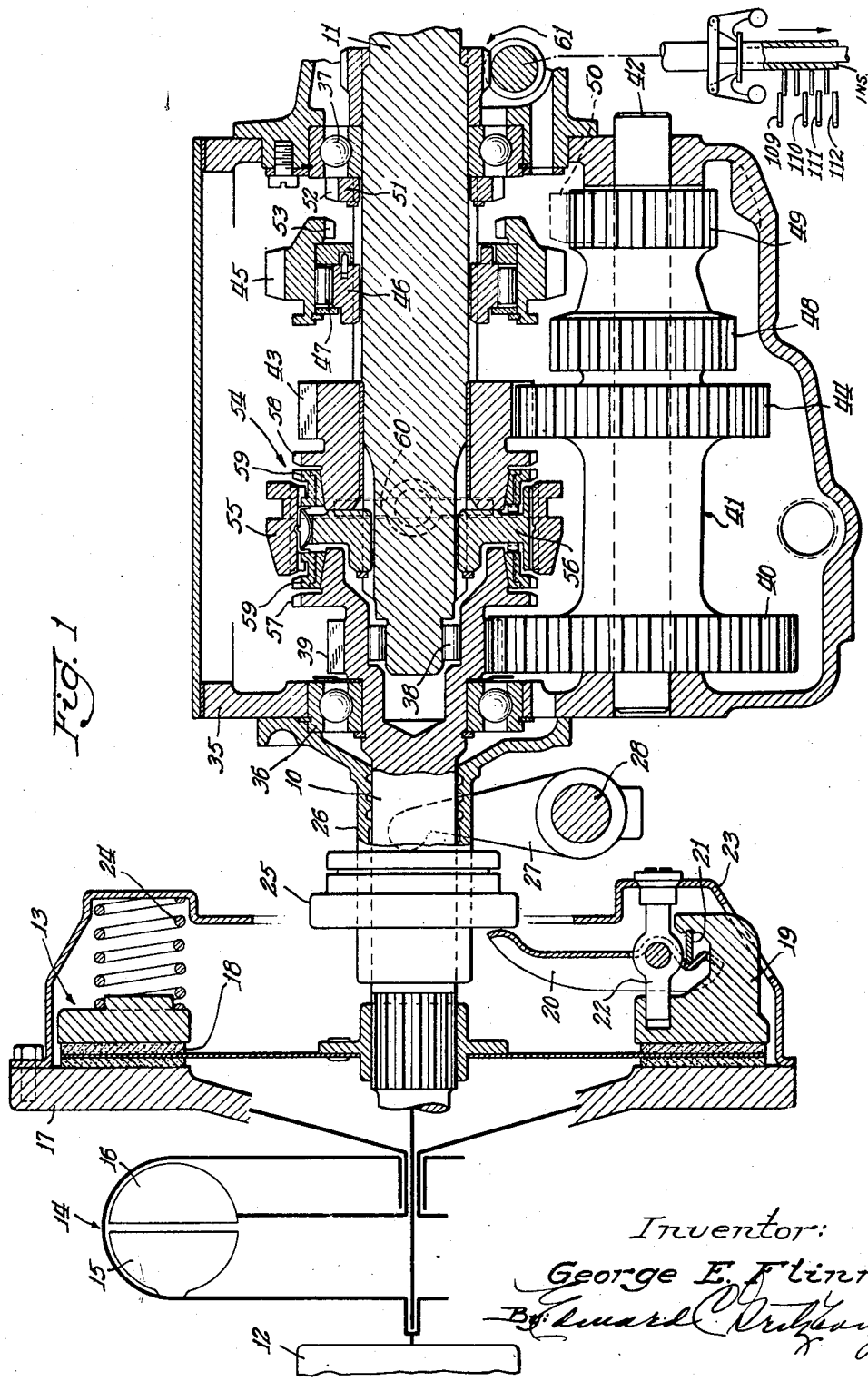
Fig. 1 is a longitudinal sectional view of an automatic transmission connected with a vehicle engine.

Fig. 10 is a diagrammatic illustration of a modified control mechanism for the transmission shown in Fig. 1, with the mechanism being shown with the vehicle speed being above ten miles per hour and with the accelerator being in open throttle or kickdown position; and Fig. 11 is a diagrammatic illustration of one of the relays used in the transmission control mechanisms illustrated in Figs. 2 to 10.

Like characters of reference designate like parts in the several views.

Referring now in particular to Fig. 1 of the drawings, the illustrated transmission is one particularly suitable for use in an automotive vehicle and comprises a drive shaft 10 and a driven shaft 11. The drive shaft 10 is adapted to be driven by means of the engine 12 of the vehicle which is the ordinary internal combustion engine usually used in such vehicles. The shaft 10 is connected with the engine by means of a friction clutch 13 and a hydraulic coupling 14. The hydraulic coupling 14 may be of any suitable well-known construction and comprises an impeller element 15 and a rotor element 16. The element 15 is driven by the motor 12 and fluid in the device 14 functions on such driving of the impeller element to drive the rotor element 16 of the device.

The clutch 13 comprises a driving element 17 and a driven element 18. The driving element is connected with the rotor 16 of the coupling device 14 and the driven clutch element 18 is connected with the drive shaft 10 of the transmission. The driven clutch element 18 is clamped between a pressure plate 19 and the driving element 17 of the clutch. Radially extending clutch levers 20 act on the pressure plate 19 by means of struts 21, and these levers are pivotally mounted on studs 22 which are fixed with respect to a clutch cover 23 which rotates with the driving element 17. Springs 24 are disposed between the cover 23 and the pressure plate 19 for yieldingly holding the pressure plate against the driven element 18 for maintaining the clutch engaged. A collar 25 is slidably disposed on a housing portion 26 for the transmission, and this collar is disposed to act against the clutch levers 20 to move the pressure plate 19 rearwardly by means of the struts 21 to disengage the clutch. The collar 25 is acted on by means of a release lever 27 fixed on a shaft 28.

The drive shaft 10 is journaled in the housing 35 for the transmission by means of a roller bearing 36, and the driven shaft 11 is journaled in the housing 35 by means of the roller bearing 37. The shaft 11 is piloted in the shaft 10 by means of rollers 38, as shown. The drive shaft 10 is formed with a spur gear 39, and this gear is in mesh with a gear 40 of a gear cluster 41. A countershaft 42 is provided in the housing 35, and the gear cluster 41 is rotatably disposed on the countershaft. A gear 43 is rotatably disposed on the driven shaft 11 and is in mesh with a gear 44 on the gear cluster 41. Another gear 45 is disposed on the driven shaft 11 and is supported with respect to the shaft by means of a hub 46 splined on the shaft and a one-way roller clutch 47. The roller clutch may be of the ordinary type comprising rollers disposed between opposite cam surfaces, and the clutch is such that it will engage when the gear 45 is driven in the forward direction for thereby driving the shaft 11. The gear cluster 41 also comprises gears 48 and 49 which are adapted to cooperate with the gear 45. The gear 49 is in mesh with an idler gear 50 which is rotatably supported by any suitable means with respect to the housing 35. The gear 45 depending on the position to which it is moved on the shaft 11 may mesh either with the gear 48 or with the idler gear 50. An element 51 having external teeth 52 is splined on the shaft 11, and the gear 45 is provided with internal teeth 53. The teeth 53 are adapted to mesh with the teeth 52 when the gear 45 is moved rearwardly of the transmission to mesh with the idler gear 50 whereby the one-way clutch 47 is rendered ineffective.

A double positive type clutch 54 is provided for connecting either the shaft 10 or the gear 43 with the shaft 11. This clutch comprises an internally toothed collar 55 slidably and non-rotatably disposed on a hub 56 which is splined to shaft 11. The shaft 10 is provided with teeth 57 and the gear 43 is provided with teeth 58 which are adapted to be meshed with the internal teeth of the collar 55 depending on the direction in which the collar is moved. A synchronizer ring 59 of any suitable well-known construction is disposed on each side of the collar 55 on the shaft 10 and on the gear 43 for synchronizing the speed of the collar with either the teeth 57 or the teeth 58 before engagement of the collar with the teeth. A yoke 60 is provided which fits in a groove formed in the collar 55 for shifting the collar as will be hereinafter described. The transmission is also controlled by means of a governor which will be hereinafter described, and the governor is driven from the driven shaft 11 by means of gearing 61.

The illustrated transmission provides three speed ratios in forward drive and one speed ratio in reverse drive. When the gear 45 is shifted into mesh with the gear 48, the transmission is conditioned for low speed forward drive and the drive is from the shaft 10 through the gears 39 and 40, the gear cluster 41, the gears 48 and 45, the one-way clutch 47 and the hub 46 to the shaft 11. The shaft 10 is driven from the engine 12 through the coupling 14 and clutch 13 as will be understood. Second speed forward drive is provided by shifting the collar 55 to mesh with the teeth 58. The drive is then from the shaft 10 through the gears 39 and 40, the gear cluster 41, the gears 44 and 43, the teeth 58, the collar 55 and the hub 56 to the shaft 11. High or third speed forward is provided by shifting the collar 55 to mesh with the teeth 57. The drive is then from the shaft 10 through the teeth 57, collar 55 and hub 56 to the shaft 11. The gear 45 may be allowed to remain in mesh with the gear 48 for both second and high speeds forward, and the clutch 47 overruns. For reverse drive the gear 45 is shifted into mesh with the idler gear 50, with the collar 55 being in its neutral position in which it is shown in Fig. 1. The drive is then from the shaft 10 through the gears 39 and 40, the gear cluster 41, the gears 49, 50 and 45, the teeth 53 and 52, and the element 51 to the shaft 11. The overrunning clutch 47 would overrun for this direction of drive, and the teeth 53 and 52 and the element 51 are thus necessary for reverse drive.

The mechanism for controlling the transmission shown in Fig. 1 comprises in general (see Fig. 2) an ignition switch 65 connected with the battery 66 of the vehicle, a "forward" conditioning switch 67, a second to high speed ratio conditioning relay 68, a first to second speed ratio conditioning relay 69, a high ratio conditioning relay 70, a coast switch 71, an electric governor 72, an accelerator switch unit 73 actuated by the accelerator 74 of the vehicle, a throttle 75 for the engine 12 and having a butterfly valve 76 connected by linkage 77 with the accelerator 74 and having another butterfly valve 78 actuated by an electric solenoid 79, an accelerator controlled clutch control or engaging valve 80, a vacuum shut-off valve 81, a one-way vacuum valve 82, an electrically controlled vacuum valve 83, a vacuum motor 84 for the clutch 13, a vacuum motor 85 connected with a lever and a switch assembly 86 for shifting the collar 55, an electrically operated vacuum valve 87 for the motor 85 and another electrically operated vacuum valve 88 for the motor 85.

The battery 66 on one terminal is grounded in accordance with standard practice, and the battery has its other terminal connected with the ignition switch 65. A fuse or other overload device 95 is connected in series with the switch 65, and the switch 67 is connected in series with the fuse. The relay 68 comprises a relay winding 96, contacts 97, contacts 98 and contacts 99. As will be noted, the winding 96 and the contacts 99 are connected in series with the switch 67.

The relay 69 comprises a relay winding 100, contacts 101 and contacts 102. One of the contacts 102 and one end of the winding 100 are connected with the switch 67, and the other of the contacts 102 is connected with one of the contacts 97, as shown. The other end of the winding 100 is connected with one of the contacts 101.

The relay 70 comprises a relay winding 103, contacts 104 and other contacts 105. One end of the winding 103 is connected with one of the relay contacts 102 and one of the contacts 105 is connected with an end of the relay winding 96 as shown. One of the contacts 104 is connected with one end of the winding 103 and the other contact is grounded.

The relays 68, 69 and 70 may be of any suitable construction. The relay 68 is shown in some detail in Fig. 11 and comprises a core 68a on which the winding 96 is disposed. A pivotally mounted armature 68b is disposed at one end of the core and carries a contact 97, a contact 98 and a contact 99. The other contacts 97, 98 and 99 are stationary, and the contacts are made and broken with movement of the armature as is apparent. The relays 69 and 70 are similar in construction to the relay 68 with the contacts 101 and 104 and the contacts 102 and 105 corresponding to the contacts 98 and 99, respectively. In the relays 69 and 70 there are no contacts corresponding to the contacts 97.

The coast switch 71 comprises contacts 106 and contacts 107 and a switch arm 108 adapted to bridge either the contacts 106 or 107. One of the contacts 106 is connected with one of the relay contacts 105, as shown. One of the contacts 107 is connected with the relay winding 100, and the other is grounded.

The governor 72 may be of any suitable type and is driven from the driven shaft 11 by the gearing 61, and the governor comprises contacts 109, 110, 111 and 112. When the driven shaft 11 is at rest, the contacts 109 are closed while the other of the governor contacts are open, as shown in Fig. 2. At approximately a speed of the shaft 11 corresponding to five miles per hour speed of the vehicle, the contacts 109 open and the contacts 110 close. At a speed of the shaft corresponding to approximately ten miles per hour, the contacts 111 close, and the contacts 112 close at approximately forty miles per hour speed of the vehicle. It will be understood that the contacts 110 remain closed at all speeds above five miles per hour, the contacts 111 remain closed at all speeds above ten miles per hour and the contacts 112 remain closed at all speeds above forty miles per hour. One of each of the sets of contacts 109, 110, 111 and 112 is grounded as shown. The other of the contacts 110 is connected with one of the contacts 101, and the other of the contacts 112 is connected with one of the contacts 98 as shown.

The accelerator switch 73 comprises contacts 113, contacts 114, contacts 115 and contacts 116, an accelerator plunger 117, and switch arms 118, 119 and 120. A spring 121 is provided between the arm 119 and a stationary part for yieldingly holding the plunger 117 and accelerator 74 in the closed throttle positions of these parts in which they are shown in Fig. 2. A spring 122 is provided for yieldingly holding the switch arm 120 in its position bridging the contacts 116. One of the contacts 113 is connected with a contact 116 and also with one of the contacts 112 of the governor. The other contact 113 is connected with one of the contacts 106 of the coast switch 71. One of the contacts 114 is connected with one of the contacts 110 of the governor, and the other of the contacts 114 is connected with one of the contacts 107 of the coast switch. One of the contacts 115 is connected with the winding 103 of the relay 70, and the other contact 115 is grounded. One of the contacts 116 is connected with one of the contacts 113 as described above, and the other contact 116 is connected with one of the governor contacts 111.

The butterfly valve 78 in the throttle 75 of the engine 12 is connected by means of a forked lever 123 with the armature 124 of the solenoid 79. The solenoid 79 when energized functions to turn the lever and thereby move the valve 78 whereby to substantially close the throttle 75 and allow the engine 12 to operate only at idling speed. One end of the solenoid is connected with the battery 66 through the switch 65 and fuse 95 as shown.

The valve 81 comprises an electric solenoid 125 for operating the valve, and this solenoid has one end connected to the battery through the fuse and the ignition switch and its other end is connected with one of the governor contacts 109. The electrically operated valve 83 comprises a solenoid 126, and one end of this solenoid also is connected with the battery through the fuse and ignition switch.

The electrically operated valve 87 comprises a solenoid 127 which has one end connected with one of the contacts 97 of the relay 68. The valve 88 comprises an electric solenoid 128, and one end of this solenoid is connected with one of the contacts 99 of the relay 68.

The suction motor 85 comprises two holding coils 129 and 130. One end of each of the holding coils is grounded as shown, and the end of the coil 129 is connected with one end of the solenoid 127 and the other end of the coil 130 is connected with one end of the solenoid 128, as shown.

The lever and switch assembly 86 comprises the switch 131 having contacts 132 and a switch arm 133. The two contacts are connected with one end of the throttle closing solenoid 79 and also with one end of the solenoid 126 of the valve 83. The switch arm 133 is grounded as shown.

The linkage mechanism 77 coupling the accelerator pedal 74 and the butterfly valve 76 of the throttle 75 together comprises a lever 140 connected by means of a link 141 with the pedal 74, another lever 142 connected by means of a link 143 with the lever 140, a bell crank lever 144 connected by a link 145 with the lever 142 and by a link 146 with a lever 147 which is connected with the valve 76. The lever 142 is pivoted at 148 and has a spring 149 acting on its end connected with the link 145. The lever 142 is formed with a portion 150 which is adapted to cooperate with the lever 140 as will be hereinafter described.

When the accelerator 74 is depressed, that is, when it is moved in a counterclockwise direction as seen in Fig. 2, the link 141 is moved to the right as seen in this figure and as indicated by the arrow, and the lever 140 is moved in a counterclockwise direction about its connection with the link 143 until it contacts the portion 150 of the lever 142. A clearance ordinarily exists between the upper end of the lever 140 and the part 150 of the lever 142 before the accelerator has been depressed for purposes which will hereinafter be described. After the lever 140 has contacted the portion 150, both the levers 140 and 142 thereafter move together about the pivot 148 in a counterclockwise direction against the action of the spring 149, and the movement of the lever 142 through the links 145 and 146 and the bell crank lever 144 moves the butterfly valve 76 to open the throttle 75. The butterfly valve 76 is the ordinary throttle opening valve ordinarily found in the throttle of an internal combustion engine, and it is opened by a depressing of the associated accelerator as in ordinary installations.

The clutch engaging valve 80 is actuated by the accelerator 74 and the accelerator linkage 77. The valve comprises a valve block 151 having a passage therein which forms a part of a vacuum conduit 152, and the block is provided with a chamber 153 therein which is connected with a conduit 154. A valve piston 155 is disposed in a cylindrical cavity in the valve block 151, and this cavity is connected by means of openings 156 with the chamber 153. The piston 155 is provided with lands 157 and 158 fitting in the cavity for the piston, and the piston is hollow as shown. A plunger 159 extends through the valve body 151, and the plunger is provided with a stop 160 on an end thereof for limiting its movement. A passage 161 is provided in the valve body, and the plunger 159 is provided with a groove 162 which completes the passage from the chamber 153 to the atmosphere when the plunger 159 is positioned with its stop 160 against the valve block 151. The plunger 159 is connected by means of a link 163 with the lever 140, as shown, and the plunger is actuated by means of the mechanism 77 as will be described.

A plunger 164 is slidably disposed in a suitable cavity in the valve casing 150, and the plunger is connected with a vacuum diaphragm motor 165 which functions to move the plunger according to the amount of vacuum effective on the diaphragm. The motor 165 comprises a spring 166 effective on the diaphragm and the motor is connected by means of a conduit 167 with the chamber 153 in the valve block 151. The plunger 159, the valve piston 155, and the plunger 164 are connected together by means of a floating lever 168. The connection of the lever 163 with the piston 155 is a simple pivotal connection while the connections of the lever 168 with the plungers 159 and 164 are pin and slot connections as shown.

The conduit 152 is connected to a vacuum conduit 169 by means of the valves 81 and 82 and a conduit 170. The conduit 169 is connected with the manifold of the engine 12 or any other suitable source of vacuum. The valve 82 is a one-way valve of any suitable construction which allows vacuum to be introduced into the conduit 170 but does not allow atmospheric pressure to enter the conduit 170 if the vacuum in the conduit 169 momentarily decreases, such as to atmospheric pressure. The valve 81 is a two position valve comprising a valve piston 171 which is actuated by the solenoid 125. The valve 81 has an atmospheric port 81a in its casing through which air may pass as will be described. When the solenoid 125 is deenergized, in which condition it is shown in Fig. 2, the piston 171 blocks the conduit 170 and permits atmospheric pressure to enter the conduit 152 through the port 81a. When the solenoid 125 is energized, the piston 171 is drawn upwardly to close the port 81a to the atmosphere and to connect the conduits 170 and 152 for thereby causing the vacuum to be applied to the valve 80.

The chamber 153 in the valve body 151 is connected to the valve 83 by means of the conduit 154. The valve 83 is also connected with the vacuum motor 84 by means of a conduit 172, and the valve is connected with the vacuum conduit 169 by means of a conduit 173. The valve 83 is a two-position valve and comprises a valve piston 174 acted on by the solenoid 126. When the solenoid 126 is deenergized, the valve piston 174 is in its position as shown in Fig. 2. In this position the valve piston blocks the conduit 173, and the valve connects the conduits 154 and 172. When the solenoid 126 is energized, the valve piston 174 is raised so as to block the conduit 154 and to connect the conduits 173 and 172. The vacuum motor 84 comprises a diaphragm 175 which is connected by means of a link 176 with a lever 177 that is fixed to the rock shaft 28 for the clutch actuating lever 27.

The valve 80 functions to cause engagement of the clutch 13 in accordance with the wishes of the driver of the vehicle as expressed through the accelerator 74, that is, the rate of engagement of the clutch 13 is under the control of the accelerator 74. The vacuum motor 84 in its condition as shown in Fig. 2 has no vacuum applied to it, and the clutch 13 is engaged. If vacuum is applied to the motor 84 through the conduit 172, the diaphragm 175 of the motor operates by means of the link 176, the levers 177, 27 and 20 and the collar 25 to disengage the clutch 13 against the action of the clutch springs 24. If the solenoid 126 of the valve 83 is energized, the valve piston 174 is raised and vacuum is applied to the motor 84 through the conduits 173 and 172 for disengaging the clutch. If the solenoid 126 of the valve 83 is deenergized to block the conduit 173, the vacuum for disengaging the clutch 13 must come through the conduits 152 and 154. When the solenoid 125 of the valve 81 is energized, the valve 81 functions to connect the conduit 152 to the conduit 169 by means of the conduit 170, and the valve 80 may function to connect the motor 84 with the conduit 152, when the accelerator is depressed as will be described, through the conduits 154 and 172.

The valve 80 functions to engage the clutch 13 according to the depression of the accelerator 74 when the valve 81 connects the conduits 170 and 152 and when the valve 83 connects the conduits 154 and 172. When the accelerator is depressed, the lever 140 is rotated counterclockwise, as has been described, and this movement is transmitted through the link 163 to the plunger 159. The plunger 159 moves to the left as seen in Fig. 2 and moves the valve piston 155 also in this direction. Movement of the piston 155 in this direction functions to connect the conduit 154 through the chamber 153, the passages 156 and the internal opening of the piston with the atmosphere to relieve the vacuum on the motor 84 to engage the clutch. The motor 165 acting through the floating lever 168 acts to move the piston 155 back to the right as the vacuum is relieved on the two vacuum motors which are connected through the chamber 153 in causing an engagement of the clutch 13, and a small movement of the plunger 159 to the left as seen in the figure thus causes only a small engagement of the clutch 13 due to the action of the motor 165, all as will be more fully described below. The clutch 13 is fully engaged when the plunger 159 is moved sufficiently so that its stop 160 contacts the valve block 151, and continued movement of the accelerator 74 thereafter toward its fully open throttle position causes movement of the levers 140 and 142 about the connection of the lever 140 with the link 163 and the lever 140 about the pivot 148 to further open the butterfly valve 76.

The vacuum motor 85 is controlled by means of the valves 87 and 88. The valve 87 comprises a valve piston 185 actuated by the solenoid 127. The valve is connected with a source of vacuum by means of a conduit 186 and with the motor 85 by means of a conduit 187. In the deenergized condition of the solenoid 127, the valve piston 185 is in its position as shown and blocks the conduit 186. When the solenoid 127 is energized, the valve piston 185 is raised and functions to connect the conduits 186 and 187 for applying vacuum to the motor 85. The valve 88 is similar in construction to the valve 87, and the similarly numbered parts function in the same manner as those in the valve 87; the valve 88 is, however, connected to the opposite side of the motor 85 and functions to energize the motor in the opposite direction.

The motor 85 comprises a piston 188 which is acted upon by a pair of springs 189 and 190. The springs function to yieldingly maintain the piston in its neutral position as will be understood. The piston is also acted on by the holding coils 129 and 130 when the piston is in either of its extreme positions, and these coils function to augment the force of the vacuum acting on the piston and applied through one of the valves 87 and 88. The piston is connected to a shift lever 191, comprising a part of the lever and switch assembly 86, by means of a rod 192. The lever 191 is swingably disposed on a shaft 193 which is rotatably disposed in the transmission housing 35 in any suitable manner (not shown). A shift element 194 is fixed to the shaft 193, and the shaft 193 has fixed thereto on its inner end an element 195 carrying the fork 69 which is disposed in the groove provided in the collar 55. The arrangement is such that when the shift element 194 is moved, the element 195 and the yoke 69 and collar 55 are given a corresponding movement.

The shift lever 191 and the shift element 194 have a lost-motion connection between them. This connection is provided by two lugs 196 and 197 disposed on opposite edges of the shift lever 191. When the shift lever 191 is moved by the motor 85, the shift lever does not function to move the shift element until one of the lugs 196 and 197 contacts the shift element. The motor 85 is adapted to shift the shift element 194 and the collar 55 only a portion of the distance required for the meshing of the internal teeth of the collar 55 with the teeth 57 and 58, and the element 195 and the collar 55 are moved the remainder of the distance required for full engagement by ball and detent means. The ball and detent means comprises a ball 198 and a spring 199 disposed between a stationary part 200 of the transmission housing 35 and the ball. Grooves 201 are provided in the shift element 195, and the ball 198 coacting with the grooves functions to move the shift element 195 and collar 55 into fully engaged positions after the motor 85 has functioned to move the shift element 195 into position so that the ball and detent means may become effective.

The switch 131 comprises a plunger 202 carrying the switch arm 133. The plunger extends through the lug 197 and is reciprocable with respect to the lug 197 and the plunger is acted on by the shift element 194. The switch is so arranged that when the shift lever 191 is acted on by the motor 85 so as to take up the lost motion between the shift element 194 and the shift lever 191, the switch arm 133 is moved to contact either of the switch contacts 132 so as to close the switch 131.

Operation

*Vehicle at rest, with ignition switch open.*—In this condition of the vehicle, the parts of the transmission and its operating mechanism are as shown in Figs. 1 and 2. The transmission is in neutral condition, and the gear 45 is in its out-of-mesh position, in which it is shown in Fig. 1. The ignition switch 65 is open and none of the electrical parts of the controlling mechanism are energized. The engine 12 is inoperative; and there is no vacuum in the conduit 169. The conduit 169 is furthermore closed with respect to the rest of the vacuum system by the valves 81 and 83; the solenoids 125 and 126 being deenergized. No vacuum is therefore exerted on the motor 84; and the clutch 13 is engaged due to the action of the clutch springs 24. The two springs 189 and 190 hold the piston 188 of the vacuum motor 85 in neutral position, and the shift collar 55 is in its neutral position.

*Transmission conditioned for low speed forward, accelerator in closed throttle position.*—This condition of the operating mechanism for the transmission is shown in Fig. 3. In this figure, as in the following figures, various of the parts of the transmission operating mechanism are shown in positions differing from their positions shown in Fig. 2, as is apparent. In Fig. 3 and in the following figures the flow of current through the various electric leads is indicated by showing these leads in heavy lines and the exhausting of the various conduits as well as the subsequent admission of air therein is indicated by appropriate arrows shown in the conduits indicating the direction of the flow of air therein.

In order to condition the transmission itself for forward movement, the gear 45 is shifted to the left as seen in Fig. 1 to bring it into mesh with the gear 48. The ignition switch 65 is closed; and the forward direction switch 67 is also closed. The engine 12 is started and is running in idling condition, and a vacuum is thus present in the conduit 169. Due to the closing of the ignition switch 65, the solenoid 125 of the valve 81 is energized to move the piston 171 of the valve upwardly to close the conduit 152 to the atmosphere and connect it with the conduit 170. A vacuum is thereby caused to exist in the conduits 170 and 152, in the valve 80, its chamber 153, the conduit 154, the valve 83 and in the conduit 172 so that vacuum is exerted on the diaphragm 175 of the vacuum motor 84. The diaphragm 175 is thereby moved and is effective through the link 176, the levers 177 and 27 and the clutch levers 20 to pull the pressure plate 19 of the clutch 13 rearwardly to disengage the clutch. The valve 80 is conditioned for operation by movement of the diaphragm of the motor 165 against the spring 166 due to the vacuum being exerted on the diaphragm through the conduit 167. This movement of the diaphragm of the motor 165 through the plunger 164 functions to move the valve piston 155 to the left as seen in the figure to substantially align its land 158 with the openings 156 in the valve 80. The two diaphragms 175 and that of the motor 165 and the springs acting on these diaphragms are so adjusted with respect to each other that the valve piston 155 functions to substantially block the openings 156 when the clutch 13 is in fully disengaged condition.

*Accelerator depressed for starting the vehicle.*—This condition of the operating mechanism of the transmission is shown in Fig. 4. The vehicle is started by depressing the accelerator 74. The depression of the accelerator functions through the linkage mechanism 77 to open the butterfly valve 76 of the throttle 75 for increasing the speed of the engine 12. Such movement of the levers 140 and 142 of the linkage 77 has the additional function of causing movement of the plunger 159 to the left as seen in the figure through the link 163; and for the present it is assumed that the accelerator has been depressed only enough to give the plunger a small movement. This movement of the plunger causes a small movement of the valve piston 155 in the same direction. This movement of the valve piston operates to connect the motor 84 through the conduit 172, the valve 83, the conduit 154, the chamber 153, the passages 156, and through the internal opening in the valve piston 155 with the atmosphere for allowing a movement of the diaphragm 175 of the motor 84 toward the right as seen in the figure with a resultant engaging movement of the clutch pressure plate 19. This decrease in vacuum in these conduits and in the chamber 153 causes a corresponding decrease in vacuum applied to the diaphragm of the motor 165 through the conduit 167 connected with the chamber 153. The diaphragm of the motor 165 thus has a small movement to the right as seen in the figure which is caused by the spring 166 to thereby cause a small movement of the valve piston 155 in this direction. This movement of the valve piston 155 again brings the land 158 of the piston over the passages 156 to prevent a further decrease in the vacuum in the conduits 154, 172, and 167, and the clutch 13 remains in partially engaged condition. It will be understood that the clutch controlling valve 155 is controlled jointly by the plunger 159 and the plunger 164 through the agency of the floating lever 168, and this movement of the plunger 159 in one direction and of the plunger 164 in the other direction results in the return of the valve 155 to its initial position blocking the passages 156.

Further, small movement of the plunger 159 to the left as seen in the figure by means of the accelerator 74 thus causes a corresponding small movement of the pressure plate 19 of the clutch 13 toward fully engaged position, and it will be apparent that the clutch 13 can be engaged as quickly as possible or in as many small different steps as desired simply by accordingly moving the accelerator 74 toward open throttle position. This movement of the accelerator, it will be understood, causes corresponding movements of the butterfly valve 76, and it will be apparent that an increasing amount of fuel is fed to the engine 12 by means of the accelerator at the same time as the clutch 13 is brought toward fully engaged condition.

The lost motion between the link 140 and the portion 150 of the lever 142 is provided so that the clutch 13 is slightly engaged before the butterfly valve 76 is moved from its engine idling position. This prevents the engine from being brought to a destructive or harmful speed before there is any engagement of the clutch. This slight engagement of the clutch is due to the fact that the plunger 159 is given a small movement before the valve 76 is moved by means of its linkage. The groove 162 is provided in the plunger for providing a direct connection with atmosphere from the chamber 153 when the plunger is moved to the limit of its movement with the stop 160 contacting the valve block 151. A release of vacuum on the vacuum motor 84 is thereby made quicker, as when the accelerator is moved quickly to fully opened position, inasmuch as the air in this case entering the chamber 153 and associated conduits need not all flow through the small passages 156.

When the plunger 159 is moved to the limit of its movement with its stop 160 contacting the valve block 151, the clutch 13 is fully engaged. The stop 160 makes such contact when the accelerator is approximately in its half open throttle position. Thereafter the lever 140 pivots about its connection with the link 163 and the lever 142 pivots about its pivot point 148, and the linkage 77 on further depression of the accelerator functions to further open the butterfly valve 76 to further increase the speed of the engine 12.

As is apparent from an inspection of the construction the greater the decrease in vacuum in the conduits 154 and 172, the greater is the engagement of the clutch 13. In starting the vehicle, particularly in cold weather, it frequently happens that the motor begins to stall. Under such conditions, the vacuum in the manifold of the engine decreases, and there would be resulting decrease in the vacuum in the conduit 169 and thereby in the conduits connected therewith. Such stalling of the engine would thus cause a further engagement of the clutch 13 and would increase the load on the engine whereby the engine would be certain to completely stall. The one-way valve 82 is provided for preventing this increase in engagement of the clutch 13 when the engine starts to stall. When there is such a decrease in vacuum in the conduit 169 due to stalling of the engine, the valve 82 closes and maintains the vacuum in the conduit 170 and the conduits connected therewith at the same high value as before the stalling to maintain the clutch 13 in the same condition of disengagement as previously. When the engine again begins to operate normally, the valve 82 reopens in response to the increase of vacuum in the conduit 169, and the operation of the clutch 13 under the control of the valve 80 proceeds as has been described.

When the clutch 13 has been thus engaged, the driven shaft 11 is driven in low speed ratio, the gear train of which has previously been described. Since the gear train includes the one-way clutch 47, this low speed drive is a free wheeling drive.

*Vehicle traveling above five miles per hour, accelerator released to open throttle position to upshift transmission to second speed.*—This condition is shown in Fig. 5 of the drawings. An upshift from first speed to second speed ratio is obtained by releasing the accelerator 74 and allowing it to return to its closed throttle position under the action of the springs 121 and 149, after the speed of the vehicle has reached five miles per hour. At five miles per hour speed of the vehicle, the governor contacts 110 close and the governor contacts 109 open, as has been described. Such opening of the contacts 109 breaks the electric circuit through the solenoid 125 for the valve 81, and the valve piston 171 returns to its position blocking the conduit 170 and opening the conduit 152 to atmosphere. After such movement of the valve piston 171, the clutch 13 cannot thereafter be disengaged due to the action of the accelerator 74.

When the accelerator returns to its closed throttle position, the contacts 114 are closed by the switch arm 119 carried by the accelerator plunger 117. An electric circuit is thus completed from the battery 66 through the switches 65 and 67, the winding 100 of the relay 69, the contacts 114 of the accelerator switch 73 and the contacts 110 of the governor 72 to ground. The relay 69 is thus energized and its contacts 101 are closed and complete a circuit from the lower end of the winding 100 to the governor contacts 110 and from thence to ground, this circuit being in parallel with that through the contacts 114 of the accelerator switch 73. Thus after the contacts 114 are once closed by movement of the accelerator 74, the relay 69 remains energized regardless of the subsequent depression of the accelerator. The contacts 102 of the relay 69 are closed when the relay is energized and they complete a circuit from the battery through the switches 65 and 67, the contacts 102, the contacts 97 of the relay 68, the solenoid 127 and the holding coil 129 to ground. The solenoid 127 is thus energized to control the valve 87.

Upon the solenoid 127 being thus energized, its valve piston 185 is moved upwardly to effectively connect the associated conduits 186 and 187 and apply vacuum to the left side of the piston 188. The valve 88 remains in its original condition and the other side of the piston is effectively connected with the atmosphere. Such application of vacuum on the piston 188 causes the piston to move toward the left as seen in the figure to thereby pull the shift lever 191 in a clockwise direction. The lug 197 of the shift lever makes contact with the shift element 194 and exerts a pressure on the shift element tending to move the shift element 194 and the collar 55 to engage the collar with the teeth 58 of the gear 43.

The switch 131 functions when such a force is exerted on the shift lever 191 to cause a disengagement of the clutch 13 and an incidental closing of the throttle 75 by means of the butterfly valve 78. As has been described, the switch 131 is closed when the shift lever 191 is so acted on by the motor 85 to tend to cause a shift of the collar 55. The switch 131 completes a circuit through the solenoid 126 for the valve 83 from the ignition switch 65, and the switch 131 also completes a circuit from the ignition switch through the solenoid 79 for the butterfly valve 78. The energization of the solenoid 126 causes the valve piston 174 of the valve 83 to move upwardly and connect the conduits 173 and 172. Vacuum is thus exerted on the diaphragm 175 of the motor 84 through the conduits 173 and 172 to disengage the clutch 13. Energization of the solenoid 79 acts on the armature 124 of the solenoid 79 and rotates the butterfly valve 78 to engine idling position, and the valve 78 remains in this condition as long as the switch 131 is closed. While the motor 84 by means of the switch 131 thus functions to disengage the clutch 13 and bring the speed of the engine 12 to idling condition, the motor 85 functions to move the collar 55 into engaged condition with the teeth 58 of the gear 43, with a synchronizer 59 functioning to synchronize the speed of the collar 55 and the gear 43 before a full engagement of the collar with the teeth. The disengagement of the clutch 13 allows an easy engagement of the collar with the teeth and an easy functioning of the synchronizer, and the action of the butterfly valve 78 is such that the engine 12 cannot be increased to harmful speed while the clutch is disengaged regardless of the fact that the accelerator 74 may be depressed after the shift has once been initiated.

*Vehicle speed above five miles per hour, upshift to second speed ratio completed, accelerator still released.*—This condition of the control mechanism is shown in Fig. 6. As has been described, the motor 85 is effective for shifting the collar 55 through the greater part of its shifting movement, and the ball and poppet means comprising the spring 199 and the ball 198 is effective to complete the shift. When the ball and poppet means functions in this manner, the shift lever 191 and the shift element 194 move back to their original relative positions in which the lugs 196 and 197 are out of contact with the shift element 194. When the shift lever and the element have such relative movement, the switch 131 opens, inasmuch as the condition of the switch 131 is dependent upon the relative positions of the shift lever and the shift element. Such opening of the switch 131 opens the circuit through the solenoid 79 for the butterfly valve 78 in the throttle 75 and also the circuit for the solenoid 126 for the valve 83. The butterfly valve 78 returns to its throttle opening position and the amount of fuel thereafter flowing through the throttle 75 to the engine is dependent only on the position of the butterfly valve 76 closed mechanically from the accelerator 74. When the solenoid 126 of the valve 83 is deenergized, the valve piston 174 returns to its position blocking the conduit 173 and connecting the conduit 154 with the conduit 172. Vacuum is thus released on the diaphragm 175 of the vacuum motor 84 and air flows through the valve 81, the conduit 152, the valve 80, the conduit 154, the valve 83 and the conduit 172, as is indicated by the arrows in the figure. The diaphragm thus moves to the right as seen in the figure and the clutch 13 is again engaged under the action of the clutch springs 24.

With the clutch 13 being engaged and the collar 55 being moved into engagement with the teeth 53, the transmission is in second speed ratio. The gear 45 remains engaged with the gear 48 in this speed ratio; however, there is no drive through these two gears inasmuch as the one-way clutch 47 overruns. The piston 188 is held in its illustrated position by the holding coil 129, when the transmission is in this speed ratio, and the holding coil functions in addition to the vacuum applied on the piston 188 through the valve 87 to hold the piston in its illustrated position. Therefore, even if the vacuum momentarily decreases, the piston nevertheless remains in its illustrated position corresponding to second speed ratio.

*Vehicle speed above five miles per hour, accelerator depressed, after shift to second speed ratio.*—This condition of the control mechanism is shown in Fig. 7. The clutch 13 remains engaged and the motor 84 for the clutch remains in communication with the atmosphere. The accelerator 74 in being depressed moves the plunger 159 of the valve 80 to the left as seen in the figure to disconnect the conduit 152 with the chamber 153 of the valve; however, the conduit 154 and the chamber 153 remain in communication with the atmosphere through the internal opening of the valve piston 155 of the valve 80. The depression of the accelerator also changes the condition of the accelerator switch 73. The contacts 114 are open, and the current therefore ceases to flow through the contacts; the relay 69 is, however, continued in energized condition by means of the circuit through the contacts 101 of the relay and the contacts 110 of the governor 72.

The contacts 115 of the accelerator switch 73 are closed by the depression of the accelerator and as a result the relay 70 is energized. The switch arm 119 on a depression of the accelerator plunger 117 completes a circuit across the contacts 115, and a circuit is thereby completed from the ignition switch 65 through the switch 67, the contacts 102 of the relay 69, the winding 103 of the relay 70 and the contacts 115 of the accelerator switch 73 to ground. The relay 70 is thus energized to close the contacts 104 and 105 of the relay. Closure of the contacts 104 completes a circuit to ground through the winding 103 of the relay which is in parallel with the circuit from the winding through the contacts 115 of the accelerator switch 73. The relay 70 thereafter thus remains energized regardless of whether or not the accelerator is so moved as to break the circuit between the contacts 115. Closure of the contacts 105 of the relay 70 conditions a circuit through the winding 96 of the relay 68 for energization by the accelerator switch 73 as will be described. During energization of the relay 70 by movement of the accelerator, the transmission remains in second speed ratio, and the shaft 11 is driven through the clutch and gears as has been described.

*Vehicle speed above ten miles per hour, accelerator moved to closed throttle position to shift from second to third speed ratios.*—This condition of the transmission control mechanism is shown in Fig. 8. Above ten miles per hour speed of the vehicle, the contacts 111 of the governor 72 are closed. These contacts are in series with the contacts 116 of the accelerator switch, and these two sets of contacts complete a circuit from the ignition switch 65, through the switch 67, the winding 96 of the relay 68, the contacts 105 of the relay 70, the contacts 106 of the switch 71, the contacts 113 of the accelerator switch 73, and the contacts 111 of the governor 72. The relay 68 is thus energized, and the contacts 98 and 99 of this relay are closed while the contacts 97 of this relay are opened. Closure of the contacts 98 complete an additional circuit from the bottom of the winding 96 of the relay 68 to the contacts 116 of the accelerator switch 73 which is in parallel with the circuit from the winding 96 through the contacts 105, the contacts 106 and the contacts 113 to the contacts 116. By means of this additional circuit, the relay 68 is continued in energized condition regardless of whether or not the accelerator is depressed to open the contacts 113 after the relay 68 has once been energized.

Opening of the contacts 97 of the relay 68 has the effect of breaking the electric circuit through the solenoid 127 for the valve 87 and deenergizing the holding coil 129. The valve piston 185 of the valve 87 thus returns to its original position blocking the associated conduit 186 and connecting the associated conduit 187 with the atmosphere. The spring 190 may then be effective to move the piston 188 to its neutral position. Closure of the contacts 99 of the relay 68 has the effect of completing a circuit from the ignition switch 65 through the switch 67 and the contacts 99 to the solenoid 128 and through the holding coil 130. This energization of the solenoid 128 causes the valve piston 185 of the valve 88 to move to its upper position and connect the associated conduits 186 and 187 while disconnecting the conduit 187 from the atmosphere. Vacuum is thus applied to the right hand end of the piston 188 and functions to move it toward the right as seen in the figure.

The force exerted on the piston 188 by the spring 190 and by the vacuum tending to move the piston toward the right as seen in the figure causes the lug 196 of the shift lever 191 to contact the shift element 194, and this change in relative position between the shift lever 191 and shift element 194 causes the switch 131 to be closed. The switch 131 when closed functions in the same manner as has been described in connection with the upshift from first to second speed ratio, which is illustrated in Fig. 5, to energize the solenoid 126 of the valve 83 and energize the solenoid 79 connected with the butterfly valve 78. This energization of the solenoid 126 causes the valve piston 174 to move upwardly and connect the conduits 173 and 172 for thereby applying vacuum to the motor 84, and the motor is then effective to disengage the clutch 13. The energization of the solenoid 79 functions to move the valve 78 to an engine idling position, so that the engine 12 remains in this condition regardless of whether the accelerator is depressed or not after the shift has once been initiated. With the clutch 13 being disengaged and the engine being maintained in idling condition, the spring 190 and the vacuum exerted on the opposite side of the piston 188 causes the shift lever to shift the shift element in a counterclockwise direction to disengage the collar 55 from the teeth 58 and to engage the collar with the teeth 57. The synchronizer 59 between the collar 55 and teeth 57 is effective to synchronize the speed of the collar and the teeth prior to engagement thereof, and such engagement is easily performed since the clutch 13 is disengaged. The transmission is now conditioned for third speed drive. The piston 188 is held at the limit of its movement to the right by the holding coil 130 as well as by the vacuum applied thereto through the valve 88. The switch 131 opens when the collar 55 is fully engaged with the teeth 57 due to the action of the ball and detent means comprising the spring 199 and ball 198 and the solenoids 126 and 79 are thereby deenergized. The deenergization of the solenoid 126 actuates the valve 83 to reengage the clutch, and the deenergization of the solenoid 79 causes an opening of the butterfly valve 78 so that the opening through the throttle 75 is thereafter solely under the control of the accelerator 74. The solenoids 126 and 79 function to engage the clutch 13 and open the butterfly valve 78 in the same manner as in a shift from first to second speed ratio as is illustrated in Fig. 6. The gear 45 remains engaged with the gear 48 in high speed ratio; however, the one-way clutch 47 overruns, and there is no drive through these gears.

*Vehicle speed above ten M. P. H., accelerator depressed to open throttle position to downshift the transmission from third to second speed ratios.*—This condition of the operating mechanism of the transmission is shown in Fig. 9. The accelerator 74 in its depressed open throttle position functions with the remainder of the operating mechanism to downshift the transmission from third speed ratio to second speed ratio, as when it is desired by the operator to obtain a high torque for passing another vehicle on the road, for example. It is to be noted from Fig. 8 that the relay 68 is kept in energized condition by means of a circuit through the contacts 116 of the accelerator switch 73. When the accelerator 74 is depressed to open-throttle position, the switch arm 120 is moved against the action of the spring 122 by means of the accelerator plunger 117 to break the circuit through the contacts 116, and the relay 68 is thus deenergized. Deenergization of the relay 68 has the effect of opening the contacts 98 and 99 of the relay and of closing the contacts 97 of the relay.

Opening of the contacts 99 of the relay 68 has the effect of deenergizing the holding coil 138 and deenergizing the solenoid 128 of the valve 88 and returning the valve piston 185 of the valve 88 to its position in which it closes the vacuum conduit 186 connected with the valve and opens the associated conduit 187 to the atmosphere. Closing of the contacts 97 of the relay 68 has the effect of completing a circuit from the ignition switch 65 through the switch 67, the contacts 102, the contacts 97, to the solenoid 127 and the holding coil 129. The valve piston 185 of the valve 87 is moved by energization of the solenoid 127 to disconnect the associated conduit 187 with the atmosphere and to connect the associated conduits 186 and 187 together. Due to these changes in condition of the valves 87 and 88, the spring 189 is effective to move the piston 188 toward the left, and the vacuum exerted on the piston through the conduit 187 connected with the valve 87 is also effective to move the piston in this direction. It will be noted that the other relays 69 and 70 remain in their energized conditions, as they were prior to the kickdown by the accelerator.

The piston 188 exerts a force on the shift lever 191 tending to move it in a clockwise direction, and the lug 197 of the shift lever contacts the shift element 194. On such change in relative positions of the shift lever and shift element, the switch 131 is closed, as has been described, and the switch completes electric circuits through the solenoid 79 for the butterfly valve 78 and through the solenoid 126 for the valve 83. Such energization of the solenoid 79 closes the butterfly valve 78 to engine idling position, and such energization of the solenoid 126 raises the piston 174 to disconnect the conduit 172 with the conduit 154 and to connect it instead with the conduit 173. The valve 83 is thus effective to apply vacuum to the motor 84 for disengaging the clutch 13. As is apparent, the switch 131 when closed is effective in the same manner as in an upshift from low speed ratio to second speed ratio which has been heretofore described and is illustrated in Fig. 5.

The clutch 13 is disengaged and the engine 12 has been reduced to idling speed, regardless of the fact that the accelerator 74 is in open throttle position, as has been described, and the piston 188 is then effective to shift the shift lever 191 and collar 55 to engage the collar with the teeth 58. The synchronizer 59 between the teeth and collar acts as before to synchronize the speed of the collar 55 and teeth 58 before engagement thereof. When the piston 188 has completed its stroke, the spring and poppet means including the ball 198 and spring 199 is effective to complete the shift of the collar, and in such a completion of the shift, the switch 131 is opened. Such opening of the switch deenergizes the solenoid 126 for the valve 83 and also the solenoid 179 for the butterfly valve 78, and the drive is then through the transmission in second speed ratio with the clutch 13 being engaged and the throttle 75 being completely under the control of the accelerator 74.

The forty mile per hour contacts 112 of the governor 72 are effective for preventing a kickdown from third speed ratio to second speed ratio by means of the accelerator when the vehicle is travelling above this speed. The contacts 112 connected with ground, it will be noted, are in parallel with the circuit including the contacts 116 of the accelerator switch 73 and the governor contacts 111. Therefore, it will be apparent that an opening of the contacts 116 by a depression of the accelerator 74 when the contacts 112 are closed can have no effect in deenergizing relay 68 for shifting from third speed ratio to second speed ratio. The governor contacts 112 thus advantageously operate to prevent a downshift above the speed at which a downshift would not produce any substantial increase in torque and would allow the engine 12 to attain destructive or harmful speeds.

The coast switch 71 is effective when moved from its position as shown in the drawings connecting the contacts 106 to its lower position connecting the contacts 107 to prevent an upshift from second speed ratio to third speed ratio or to downshift the transmission to second speed ratio if it is in high speed ratio. This switch is useful when the vehicle is descending a steep grade at which time it is desired to use the engine 12 as a brake for the vehicle. As has been described in connection with Fig. 8, the circuit for energizing the winding 96 of the relay 68 for shifting the transmission from second speed ratio to third speed ratio includes the contacts 105, the contacts 106 of the coast switch 71, the contacts 113 of the accelerator switch 73, the contacts 116 of this switch and the governor switch 111. By moving the switch 71 from its illustrated position to its position connecting the contacts 107, this circuit is broken, and a release of the accelerator 74 cannot function to shift the transmission into high speed ratio. The switch 71 in connecting the contacts 107 functions to energize the relay 69 and to maintain it energized. As has been described in connection with Fig. 5, the energization of the relay 69, when the relay 68 is deenergized, causes a shift of the transmission to second speed ratio, a circuit being completed from the ignition switch through the forward direction switch 67, the contacts 102 of the relay 69, the contacts 97 of the relay 68, the solenoid 127 of the valve 87 and the holding coil 129. As has been described in connection with the latter figure, the upshift from first speed to second speed is ordinarily made by a circuit from the ignition switch including the forward direction switch 67, the winding 100 of the relay 69, the contacts 114 of the accelerator switch 73 and the contacts 110 of the governor switch 72; however, the coast switch 71 in connecting the contacts 107 accomplishes this function of energizing the relay 69 simply by grounding the winding 100 of the relay, and it is not necessary to connect the contacts 114 of the accelerator switch 73 by bringing the accelerator to a closed throttle position.

In order to shift the transmission into reverse the gear 45 is simply shifted from its neutral position in which it is shown in Fig. 1 rearwardly to interengage its teeth 53 with the teeth 52 of the element 51 splined on the driven shaft 11. In so moving the gear 45, it is also brought into mesh with the idler gear 50. The forward direction switch 67 is also opened, and this has the effect of maintaining deenergized all of the relays 68, 69 and 70 and the associated electrical circuits. When the vehicle is running in reverse drive, therefore, the shift lever 191 is not shifted by the motor 85, inasmuch as neither of the solenoids 127 and 128 is at any time energized. The solenoid 125 is energized through the governor contacts 109 when the vehicle speed is less than five miles per hour in reverse drive whereby the valve 81 connects the conduits 170 and 152. The clutch 13 is thus engaged and disengaged under the control of the accelerator 74 in reverse drive in the same manner as in forward drive.

*Modified transmission control system*

A modified transmission control system as shown in Fig. 10 in the condition in which it is with the accelerator depressed to open-throttle position. It has been found in certain embodiments of the transmission control system in its form in which it is shown in Figs. 2 to 9 that if the conduits 186 and 187 are too small in diameter, the springs 189 and 199 act so quickly that the vacuum on the piston 188 did not become effective in time to maintain the switch 131 closed for the entire movement of the piston from its second speed ratio position to its third speed ratio position or vice versa. This resulted in an engagement of the clutch 13 before the shift was completed. This modification, as shown in Fig. 10, has been designed to obviate this difficulty, without changing the conduits 186 and 187 or the springs 189 and 199 in any way.

The change of the Fig. 10 embodiment over that shown in Figs. 2 to 9 comprises the addition of a switch 210 actuated by the vacuum motor 85. The switch 210 comprises a pivotally mounted switch arm 211 having a pin and slot connection 212 with the link 192. The switch arm 211 is an electric conductor and cooperates with a contact 213 in the form of an arc. The arc 213 is continued on its ends by portions 214 which are of nonconducting material. The switch arm 211 is connected with one of the contacts 114 of the accelerator switch 73, and the contact 213 of the switch is connected with the contacts 132 of the switch 131. As is apparent, the switch 210 is closed when the piston 188 is in neutral position and is open when the piston 188 is in either of its positions providing the second or third speed ratios through the transmission.

After the transmission has been shifted from second to third speed ratio and the accelerator is depressed to downshift the transmission, the control mechanism is in condition in which it is shown in Fig. 10, assuming that the spring 189 has acted before the vacuum has had effect on the piston 188 to move the shift lever 191 to neutral position. In this condition of the mechanism, the ball and detent means comprising the ball 198 and the spring 199 is effective to move the shift element 194 to its neutral position, so that the switch 131 is open. In this case, the solenoid 126 for the valve 83 and the solenoid 79 for the butterfly valve 78 are maintained energized, so that the engine is held in engine idling condition and the valve 83 continues to cause the clutch to remain disengaged, by a circuit in lieu of the switch 131 which comprises the switch 210, the contacts 101 of the relay 69 and the contacts 110 of the governor 72. The throttle solenoid 79 and the valve solenoid 126 thus remain energized, although there has been a temporary stop in the movement in the piston 188 resulting in an opening of the switch 131. If the same condition should exist, that is if the switch 131 should be temporarily opened, when the transmission is being upshifted from second speed ratio to third speed ratio, the switch 210 functions in the same manner to complete circuits through the solenoids 79 and 126 for maintaining the clutch 13 disengaged and the throttle valve 78 closed during the shift.

My improved transmission control mechanism advantageously provides a forced upshifting from first to second and from second to third speed ratios without the possibility that second speed may be omitted. The vacuum motor for shifting the transmission in conjunction with the switch 131 associated therewith and also in conjunction with the relays which when once energized by a movement of the accelerator cannot be subsequently deenergized by a movement thereof prior to the completion of the shift, assure a shift regardless of a subsequent movement of the accelerator prior to the completion of the shift. The governor in conjunction with the rest of the control mechanism advantageously allows an upshift from first to second speed ratios only above a predetermined speed of the vehicle and an upshift from second to third speed ratios only above a predetermined higher speed of the vehicle. A downshift of the transmission is prevented by the governor above a predetermined speed of the vehicle. The coast switch 71 advantageously functions to put the transmission into second speed ratio and keep it in that ratio regardless of the movement of the accelerator in order that the engine may be used as a brake for the vehicle when desired.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for a motor vehicle, the combination of a drive shaft, a driven shaft, gearing for providing a low speed ratio and a high speed ratio between said shafts, an accelerator for the vehicle, means under the control of said accelerator for shifting the transmission mechanism into said low speed ratio when the accelerator is moved to one of the limits of its movement, means under the control of said accelerator for shifting the transmission mechanism from low to high speed ratio when the accelerator is moved to the said limit of its movement, said last named means only being effective when conditioned for operation, and means under the control of said accelerator for conditioning said second named means for operation when the accelerator is moved to an intermediate position thereof while said low speed ratio is established.

2. In transmission mechanism for a motor vehicle, the combination of a drive shaft, a driven shaft, gearing for providing a low speed ratio and a high speed ratio between said shafts, an accelerator for the vehicle, means under the control of said accelerator for shifting the transmission mechanism into said low speed ratio when the accelerator is moved to one of the limits of its movement and including an electric relay, means under the control of said accelerator effective for shifting the transmission mechanism from low to high speed ratio when the accelerator is moved to the said limit of its movement, said last named means including a relay and being so effective only when conditioned for operation, and means including another electric relay and being under the control of said accelerator for conditioning the second named means for operation when the accelerator is moved to an intermediate position thereof while said low speed ratio is established.

3. In transmission mechanism for a motor vehicle, the combination of a drive shaft, a driven shaft, gearing for providing a low speed ratio and a high speed ratio between said shafts, an accelerator for the vehicle, means under the control of said accelerator for shifting the transmission mechanism into said low speed ratio when the accelerator is moved to one of the limits of its movement and including a switch closed by the accelerator when it is at such limit, means under the control of said accelerator for shifting the transmission mechanism from low to high speed ratio when the accelerator is moved to the said limit of its movement and including another switch closed when the accelerator is at its said limit, said last named means only being effective when conditioned for operation, and means under the control of said accelerator for conditioning said second named means for operation when the accelerator is moved to an intermediate position thereof while said low speed ratio is established, said last named means including a switch completed in said intermediate accelerator position.

4. In transmission mechanism for a motor vehicle, the combination of a drive shaft, a driven shaft, gearing for providing two different speed ratios between said shafts, an accelerator for the vehicle, means under the control of said accelerator for shifting the transmission mechanism into one of its said speed ratios when the accelerator is moved to one of the limits of its movement, said last named means including an electric relay and a switch in series with the relay completed when the accelerator is at its said limit, means under the control of said accelerator for shifting the transmission mechanism from its said last named speed ratio to its other speed ratio when the accelerator is moved to its said limit of movement, said last named means being so effective only after being conditioned for operation and including a relay and an accelerator switch in series therewith and completed when the accelerator is at its said limit of movement, means under the control of said accelerator for conditioning said second named means for operation when the accelerator is moved to an intermediate position thereof while said low speed ratio is established, said third named means including a relay and an accelerator switch in series with the relay completed when the accelerator is in its said intermediate position, and electric circuit means shunting each of said switches adapted for maintaining the respective relays energized after they have once been energized by means of the switches.

5. In transmission mechanism for a motor vehicle, the combination of a drive shaft, a driven shaft, gearing for providing a first speed ratio, a higher or second speed ratio and a still higher or third speed ratio between said shafts, an accelerator for the vehicle, means under the control of said accelerator for shifting the transmission mechanism from said first speed ratio to said second speed ratio when the accelerator is moved to one of the limits of its movement, said last named means including an electrical relay and an accelerator switch closed when the accelerator is in its closed throttle position and being in series with the relay, means for shifting the transmission mechanism from said second speed ratio to said third speed ratio when the accelerator is moved to its closed throttle position, said last named means being effective only when so conditioned and including an electrical relay and an accelerator switch closed when the accelerator is in closed throttle position and being in series with the relay, means under the control of said accelerator for conditioning said second named means for operation when the accelerator is moved to an intermediate position thereof while said second speed ratio is established, said last named means including an electrical relay and an accelerator switch closed when the accelerator is in its said intermediate position and being in series with the relay, and an electrical circuit means shunting each of said switches adapted for maintaining the respective relays energized after they have once been energized by means of the switches.

6. In transmission mechanism for a motor vehicle, the combination of a drive shaft, a driven shaft, gearing for providing a low speed ratio and a high speed ratio between said shafts, an accelerator for the vehicle, means under the control of said accelerator for shifting the transmission mechanism into low speed ratio when the accelerator is moved to one of the limits of its movements, said last named means including a relay and an accelerator switch in series with the relay and closed when the accelerator is at its said limit of movement, means under the control of said accelerator and effective only when conditioned for operation for shifting the transmission mechanism from low to high speed ratio when the accelerator is moved to the said limit of its movement, said last named means including a relay and an accelerator switch in series therewith closed when the accelerator is at its said limit of movement, means under the control of said accelerator for conditioning said second named means for operation when the accelerator is moved to an intermediate position thereof while said low speed ratio is established, said last named means including a relay and an accelerator switch in series therewith closed when the accelerator is at its said intermediate position, and a governor driven by said driven shaft and having a switch closed at one speed of the governor and another switch closed at a higher speed of the governor, said first named governor switch being connected in series with said first named accelerator switch whereby this accelerator switch cannot be effective until said one governor speed is reached and said second named governor switch being connected in series with said second named accelerator switch whereby the latter accelerator switch cannot be effective until said higher governor speed is reached.

7. In transmission mechanism for a motor vehicle, the combination of a drive shaft, a driven shaft, gearing for providing a plurality of speed ratios between said shafts, an accelerator for the vehicle, a governor responsive to the speed of said driven shaft, and means under the control of said accelerator and said governor for shifting the transmission mechanism into one of said speed ratios when the accelerator is moved to one of the limits of its movement and said driven shaft is rotating at a predetermined speed and for shifting the transmission mechanism into another speed ratio when the accelerator is moved to said one of the limits of its movement and the driven shaft is rotating at a higher predetermined speed, said means including two governor switches one being closed at said predetermined speed of the driven shaft and the other being closed at said higher predetermined speed of the driven shaft, and two accelerator switches actuated by the accelerator and each closed when the accelerator is moved to a limit of its movement, one of said accelerator switches being connected in series with one of said governor switches and the other accelerator switch being connected in series with the other of said governor switches.

8. In transmission mechanism for a motor vehicle, the combination of a drive shaft, a driven shaft, gearing for providing a first speed ratio, a higher or second speed ratio and a still higher or a third speed ratio between said shafts, an accelerator for the vehicle, a governor responsive to the speed of said driven shaft, means under the control of said accelerator and said governor for shifting the transmission mechanism from first to second speed ratios above a predetermined speed of the driven shaft, and means under the control of said accelerator and said governor for shifting the transmission mechanism from said second speed ratio to said third speed ratio above a predetermined higher speed of said driven shaft, each of said means including a switch actuated by said accelerator and closed when the accelerator is in closed throttle position and a governor switch closed at the respective predetermined speed of said driven shaft and in series with the accelerator switch.

9. In transmission mechanism for a motor vehicle, the combination of a drive shaft, a driven shaft, gearing for providing a first speed ratio, a higher or second speed ratio and a still higher or third speed ratio between said shafts, an accelerator for the vehicle, a governor responsive to the speed of said driven shaft, means under the control of said accelerator and said governor for shifting the transmission mechanism from first to second speed ratios above a predetermined speed of the driven shaft when the accelerator is moved to a closed throttle position, means under the control of said accelerator and governor for shifting the transmission mechanism from second to third speed ratios above a higher predetermined speed of the driven shaft when the accelerator is moved to its closed throttle position, each of said means including an accelerator switch actuated by the accelerator and closed when the accelerator is in its closed throttle position and a governor switch closed at the respective predetermined speed of the driven shaft, and means modifying the action of said second-named means so that the shift from second speed ratio to third speed ratio can occur only after the shift from first to second speed ratios has taken place and including an accelerator switch actuated by the accelerator and closed in a partially open throttle position of the accelerator.

10. In transmission mechanism for a motor vehicle, the combination of a drive shaft, a driven shaft, gearing for providing a first speed ratio, a higher or second speed ratio and a still higher or a third speed ratio between said shafts, an accelerator for the vehicle, a governor responsive to the speed of said driven shaft, means under the control of said accelerator and said governor for shifting the transmission mechanism from said first speed ratio to said second speed ratio when the accelerator is moved to its closed throttle position and the driven shaft is rotating above a predetermined speed, means for shifting the transmission mechanism from said second speed ratio to said third speed ratio when the accelerator is moved to its closed throttle position and the driven shaft is rotating above a higher predetermined speed, each of said means including a governor switch closed at the respective predetermined speed of the driven shaft and an accelerator actuated switch which is closed in the closed throttle position of the accelerator and which is in series with the governor switch, and means for downshifting the transmission from third speed ratio to second speed ratio when the accelerator is moved to open throttle position and including a switch in series with the accelerator and the governor switch for said second named means, said open throttle accelerator switch being opened when the accelerator is moved to its open throttle position.

11. In transmission mechanism for a motor vehicle, the combination of a drive shaft, a driven shaft, gearing for providing a low speed ratio and a high speed ratio between said shafts, an accelerator for the vehicle, a governor responsive to the speed of the driven shaft, means under the control of said accelerator and said governor for shifting the transmission mechanism from said low speed ratio to said high speed ratio when the accelerator is moved to its closed throttle position and the speed of the driven shaft is above a predetermined value, said means including a governor actuated switch closed above a predetermined speed of said driven shaft and an accelerator switch connected in series with the governor switch and closed when the accelerator is in its closed throttle position, means under the control of said accelerator for downshifting the transmission mechanism from its high speed ratio to its low speed ratio and including a switch connected in series with said accelerator and governor switches and actuated by the accelerator so as to be opened when the accelerator is in its open throttle position, and means for preventing such a downshift above a higher predetermined speed of said driven shaft and including another governor switch closed at said higher predetermined speed of said driven shaft and connected in parallel with said kickdown switch.

12. In transmission mechanism for a motor vehicle, the combination of a drive shaft, a driven shaft, gearing for providing a first or low speed ratio, a higher or second speed ratio, and a still higher or third speed ratio between said shafts, an accelerator for the vehicle, a governor responsive to the speed of said driven shaft, means under the control of said accelerator and said governor for shifting the transmission from said first to said second speed ratio when the accelerator is moved to its closed throttle position and the speed of said driven shaft is above a predetermined value, means for shifting the transmission mechanism from its second speed ratio to its third speed ratio when the accelerator is moved to its closed throttle position and the speed of said driven shaft is above a higher predetermined speed, each of said means including a governor switch closed at the respective predetermined speed of the driven shaft and an accelerator switch closed when the accelerator is in its closed throttle position and connected in series with the governor switch, means for downshifting the transmission from said third speed ratio to said second speed ratio and including a kickdown switch connected in series with the accelerator and governor switches for said second named means and adapted to be opened when the accelerator is in its open throttle position, and means for preventing such a downshift of the transmission mechanism above a still higher predetermined speed of the driven shaft and including a third governor switch connected in parallel with said kickdown switch and closed at said last named predetermined speed of the driven shaft.

13. In transmission mechanism for a motor vehicle, the combination of a drive shaft, a driven shaft, gearing for providing low, intermediate and high speed ratios between said shafts, an accelerator for the motor vehicle, means including electrical means under the control of said accelerator for shifting the transmission mechanism from low to intermediate speed ratios when the accelerator is moved to one of the limits of its movement, means including electrical means for shifting the transmission mechanism from intermediate to high speed ratios when the accelerator is moved to the same limit of its movement, means for differentiating between said two first named means whereby only one of the means is operative on the same movement of the accelerator, and means for overruling said accelerator as a control for said two first named means and rendering said first named means operative to maintain the mechanism in intermediate speed ratio and said second named means inoperative regardless of the movement of said accelerator for holding the transmission mechanism in its said one of said speed ratios.

14. In transmission mechanism, the combination of a drive shaft, a driven shaft, gearing for providing two different speed ratios between said shafts, means for shifting the transmission mechanism into one of said speed ratios and including an electric circuit and a switch therein, means for shifting the transmission mechanism into the other of its said speed ratios and including an electric circuit and a switch therein, and a pair of lockup switches one being associated with one of said first named switches and the other being associated with the other of said first named switches and simultaneously actuatable for overruling said first named switches regardless of their electrical condition and rendering said first named means operative and said second named means inoperative whereby the transmission mechanism is held in its said one of said speed ratios.

15. In transmission mechanism for a motor vehicle, the combination of a drive shaft, a driven shaft, gearing for providing two different speed ratios between said shafts, means for shifting the transmission mechanism into one of said speed ratios and including an electric circuit and a switch therein, means for shifting the transmission mechanism into the other of its said speed ratios and including an electric circuit and a switch therein, an accelerator for the motor vehicle and adapted to actuate said switches whereby a shift into either of said speed ratios is made when the accelerator is moved to one of the limits of its movement, means for differentiating between said two first named means whereby only one of the means is operative on the same movement of the accelerator, and a pair of lockup switches one being associated with one of said first named switches and the other being associated with the other of said first named switches and simultaneously actuatable for overruling said first named switches regardless of the position of the accelerator and rendering said first named means operative and said second named means inoperative whereby the transmission mechanism is held in its said one of said speed ratios.

16. In transmission mechanism, the combination of a drive shaft, a driven shaft, gearing for providing two different speed ratios between said shafts, means for shifting the transmission mechanism into one of said speed ratios, said last named means including an electric circuit and a switch therein which when closed renders the means operative, means for shifting the transmission mechanism into the other of its said speed ratios, said last named means including an electric circuit and the switch therein which when closed renders the means operative, and a pair of lockup switches one being in series with first named switch and the other being in parallel with said second named switch, said lockup switches being simultaneously operable to open the first lockup switch and close the second lockup switch whereby to render said first named means operative and said second named means inoperative regardless of the electrical condition of their control switches for holding the transmission mechanism in its said one of said speed ratios.

17. In transmission mechanism for a motor vehicle, the combination of a drive shaft, a driven shaft, gearing for providing two different speed ratios between said shafts, means for shifting the transmission mechanism into one of said speed ratios, said last named means including an electric circuit and a switch therein which when closed functions to render the means operative, means for shifting the transmission mechanism into the other of its said speed ratios, said last named means including an electric circuit and a switch therein which when closed renders the means operative, an accelerator for the vehicle, said accelerator actuating said switches whereby to close the switches when the accelerator is in its closed throttle position, means for differentiating between said two first named means whereby only one of the means is operative on the same movement of the accelerator, and a pair of lockup switches one being in series with said second named switch and the other being in parallel with said first named switch said lockup switches being simultaneously actuatable to open said first named lockup switch and to close said second named lockup switch for overruling said first named switches regardless of their electrical condition and rendering said first named means operative and said second named means inoperative whereby to hold the transmission mechanism in its said one of said speed ratios.

18. In transmission mechanism for a motor vehicle, the combination of a drive shaft, a driven shaft, gearing for providing a first speed ratio, a higher or second speed ratio and a still higher or third speed ratio, means for shifting the transmission mechanism from said first to said second speed ratios, said means including an electric circuit and a switch therein which when closed functions to render the means operative, means for shifting the transmission mechanism from said second to said third speed ratio, said last named means including an electric circuit and a switch therein which when closed functions to render the means operative, an accelerator for the vehicle, said accelerator actuating said switches and closing the switches when the accelerator is moved to its closed throttle position, means for preventing said second named means from becoming operative until the transmission mechanism has been shifted into said second speed ratio and the accelerator has been moved to a partially open throttle position and including a switch actuated by the accelerator and closed at said partially open throttle position thereof, and a pair of lockup switches, one of said lockup switches being connected in series with said second named switch and the other lockup switch being connected in parallel with said first named switch, said lockup switches being simultaneously actuatable to open the first lockup switch and to close the second lockup switch for overruling said two first named accelerator actuated switches regardless of their electrical condition and rendering said first named means operative and said second named means inoperative whereby to hold the transmission mechanism in its second speed ratio.

19. In transmission mechanism, the combination of a drive shaft, a driven shaft, change speed gearing between said shafts, a shift lever for said gearing and having an engaged and a neutral position, a motor for shifting said lever, said motor being adapted to shift the lever only a part of the way from its neutral position to its engaged position, and spring detent means for completing the movement of the lever to its engaged position.

20. In transmission mechanism, the combination of a drive shaft, a driven shaft, change speed gearing between said shafts, a shift lever for said gearing and having an engaged and a neutral position, a fluid pressure differential motor having a movable piston which is connected with said lever for shifting the lever, said motor being adapted to shift the lever only a part of the way from its neutral position to its engaged position, and spring detent means for completing the movement of the lever to its engaged position.

21. In transmission mechanism, the combination of a drive shaft, a driven shaft, an engine for driving said drive shaft, a throttle for said engine, power operated means for substantially closing said throttle, change speed gearing between said shafts, a shift element for changing the speed ratio through said gearing, a shift lever having a lost-motion connection with said shift element and adapted to shift the element, and means responsive to the relative movement between said shift lever and element for energizing said throttle closing means when said shift lever is utilized for shifting said shift element.

22. In transmission mechanism, the combination of a drive shaft, a driven shaft, an engine for driving said drive shaft, a throttle for said engine, electrically controlled means for substantially closing said throttle, change speed gearing between said shafts, a shift element for changing the speed ratio through said gearing, a shift lever having a lost-motion connection with said shift element and adapted to shift the element, and an electric switch connected with said shift lever and element and closed on relative movement between the lever and element when the shift lever is utilized for shifting the shift element, said switch being connected with said electrically controlled means for substantially closing the throttle when the shift lever is so utilized.

23. In transmission mechanism for a motor vehicle, the combination of a drive shaft, a driven shaft, gearing for providing low, intermediate and high speed ratios between said shafts, an accelerator for the motor vehicle, means under the control of said accelerator for shifting the transmission mechanism from low to intermediate speed ratios when the accelerator is moved to one of the limits of its movement, means for shifting the transmission mechanism from intermediate to high speed ratios when the accelerator is moved to the same limit of its movement, means controlled by said accelerator and rendered effective during the completion of the intermediate speed ratio for conditioning said intermediate to high speed ratio shifting means for operation upon a subsequent movement of said accelerator to its said limit of movement, whereby the intermediate speed ratio must be established before the high speed ratio can be established, and means for overruling said accelerator as a control for said two shifting means and rendering the low to intermediate shifting means operative to maintain the mechanism in intermediate speed ratio and said intermediate to high speed ratio shifting means inoperative regardless of the movement of said accelerator.

24. In transmission mechanism, the combination of a drive shaft, a driven shaft, gearing for providing a plurality of speed ratios between said shafts and including coupling means respectively engageable for establishing each of the speed ratios, an engine for driving said drive shaft and including a throttle valve for controlling the speed of the engine, an accelerator connected with said throttle valve, accelerator controlled means responsive to movement of the accelerator to one of the limits of its movement for engaging one of said coupling means to establish one speed ratio, accelerator controlled means responsive to movement of the accelerator to the other limit of its movement for engaging another of said coupling means to establish another speed ratio, an auxiliary throttle valve, and both of said two last-named means under the control of said accelerator including means for automatically temporarily substantially closing said auxiliary throttle valve to thereby reduce the speed of said engine while either coupling means is being engaged.

25. In transmission mechanism, the combination of a drive shaft, a driven shaft, gearing for providing a plurality of speed ratios between said shafts and including positive type clutches respectively engageable for establishing each of the speed ratios, an engine for driving said drive shaft and including a throttle valve for controlling the speed of the engine, an accelerator connected with said throttle valve, accelerator controlled means responsive to movement of the accelerator to its open throttle position for engaging one of said positive type clutches to establish one speed ratio, accelerator controlled means responsive to movement of the accelerator to its closed throttle position for engaging another of said positive type clutches to establish another of said speed ratios, an auxiliary throttle valve, and both of said two last-named accelerator controlled means including means for automatically temporarily substantially closing said auxiliary throttle valve to thereby reduce the speed of said engine while either clutch is being engaged.

26. In transmission mechanism, the combination of a drive shaft, a driven shaft, gearing for providing a plurality of speed ratios between said shafts and including a plurality of coupling means respectively engageable for establishing each of the speed ratios, said coupling means including a common movable element for engaging and disengaging the respective coupling means, an engine for driving said drive shaft and including a throttle valve for controlling the speed of the engine, an accelerator for controlling said throttle valve, a motor for moving said movable element into different positions for respectively establishing one or another of said speed ratios when the motor is operative, means connecting said accelerator and said motor for rendering the motor operative to move the movable element into one position when the accelerator is at one of the limits of its movement to establish one of the speed ratios, means connecting said accelerator and said motor for rendering the motor operative to move the movable element into another of its positions when the accelerator is at the other limit of its movement to establish another of the speed ratios, an auxiliary throttle valve, and means rendered operative by said motor when the latter is operative for substantially closing said auxiliary throttle valve.

27. In transmission mechanism, the combination of a drive shaft, a driven shaft, gearing for providing a plurality of speed ratios between said shafts and including a plurality of positive type clutches for respectively establishing each of the speed ratios, said clutches including a common movable clutch element for engaging and disengaging the clutches, an engine for driving said drive shaft and including a throttle valve for controlling the speed of the engine, an accelerator for controlling said throttle valve, a motor for moving said movable element into different positions for respectively establishing one or another of said speed ratios when the motor is operative, means interconnecting said accelerator and said motor whereby the motor is rendered operative to move the movable element into one position when the accelerator is in its open throttle position to establish one of the speed ratios, means interconnecting said accelerator and said motor whereby the motor is rendered operative to move the movable element into another position when the accelerator is in its closed throttle position to establish another of the speed ratios, an auxiliary throttle valve, and means rendered operative by said motor when the latter is operative for substantially closing said auxiliary throttle valve.

28. In transmission mechanism, the combination of a drive shaft, a driven shaft, gearing for providing a high speed ratio and a low speed ratio between said shafts and including a pair of positive type clutches for respectively establishing each of said speed ratios, a common movable clutch element for engaging and disengaging said positive type clutches, an engine for driving said drive shaft and including a throttle valve for controlling the speed of the engine, a motor for moving said movable element into one position for disestablishing said high speed ratio and establishing the low speed ratio when the motor is operative or for moving said movable element into a second position for disestablishing said low speed ratio and establishing said high speed ratio when the motor is operative, an accelerator connected to control said throttle valve and interconnected with said motor for rendering the motor operative to move said movable element to said one position when the accelerator is moved to its open throttle position and for rendering the motor operative to move said movable element to said second position when the accelerator is moved to its closed throttle position, an auxiliary throttle valve, and means rendered operative by said motor when the latter is operative for substantially closing said auxiliary throttle valve until the shift from either speed ratio to the other is completed.

29. In transmission mechanism, the combination of a drive shaft, a driven shaft, gearing for providing relatively low and high speed ratios between said shafts and including a positive type clutch for establishing each of the speed ratios, a movable clutch element for engaging and disengaging said positive clutches, an engine for driving said drive shaft and including a throttle, a motor for said movable element for disengaging the positive clutch in the gearing providing said low speed ratio and engaging the other clutch when the motor is operative, an electric switch connected with said motor and said movable element and jointly controlled thereby and adapted to be put in changed electrical condition when the motor is operative to make a shift from said low to said high speed ratio and prior to a complete movement of the movable element, and electrical throttle operating means connected with said switch and adapted to substantially close said throttle when said switch is in its said changed electrical condition.

30. In transmission mechanism, the combination of a drive shaft, a driven shaft, gearing for providing a pair of speed ratios between said shafts and including a positive type clutch for establishing each of said speed ratios, said clutches including a movable clutch element for engaging and disengaging the clutches, an engine for driving said drive shaft and including a throttle means, an accelerator connected to operate said throttle means, a motor for said movable clutch element for disestablishing one of said speed ratios and establishing the other speed ratio when the motor is operative, means interconnecting said motor and said accelerator whereby the motor is rendered operative when the accelerator is moved to one of the limits of its movement, an electrical switch connected with said motor and movable clutch element and jointly controlled thereby and adapted to be put into changed electrical condition when said motor is operative to move the clutch element and prior to a complete movement of said element, and an electric throttle control mechanism connected with said switch for substantially closing said throttle means when the switch is in its changed electrical condition.

31. In transmission mechanism, the combination of a drive shaft, a driven shaft, gearing for providing a high speed ratio and a low speed ratio between said shafts and including a positive type clutch for establishing each of the speed ratios, a movable clutch element for engaging and disengaging the positive type clutches, an engine for driving said drive shaft and including a throttle means, an accelerator connected to operate said throttle means, a shift lever connected to move said movable clutch element and having a lost-motion connection therewith, a motor connected with said shift lever to move the lever, means interconnecting the accelerator and said motor whereby the motor is rendered operative when the accelerator is moved to its open throttle position for engaging one of said positive clutches and disengaging the other to downshift the transmission from high speed ratio to low speed ratio, a switch cooperating with said movable clutch element and said shift lever and being jointly controlled thereby so as to be electrically closed when said motor moves said shift lever and thereby said shiftable clutch element and prior to a complete movement of said element, and electric throttle operating mechanism connected with said electric switch and rendered operative to substantially close said throttle means when said switch is closed.

32. In transmission mechanism, the combination of a drive shaft, a driven shaft, gearing for providing two different speed ratios between said shafts and including a positive type clutch for establishing each of the speed ratios, said clutches including a movable clutch element for engaging and disengaging the clutches, a clutch shift lever having a lost-motion connection with said clutch element whereby the clutch element is moved by said shift lever, an engine for driving said drive shaft and including a throttle means, an accelerator for said throttle means, a motor for said shift lever for moving said clutch element from its position in which one of the clutches is engaged and a portion of the distance to its other clutch engaged position, detent means for completing the movement of the clutch element to its last-named position, a switch operatively connected with said shift lever and clutch element and adapted to be put in a changed electrical condition when said motor is operative to move the shift lever due to said lost-motion connection, electric throttle closing mechanism connected with said switch and operative when the switch is in its said changed electrical condition, and means connecting said accelerator and said motor to render the motor operative when the accelerator is moved to one of the limits of its movement.

33. In transmission mechanism, the combination of a drive shaft, a driven shaft, an engine for driving said drive shaft and having a throttle, an accelerator for said engine, change speed gearing between said shafts, a shift element for said gearing for changing the speed ratio therethrough, a piston-type motor having its piston connected with said shift element for shifting the element, means under the control of said accelerator for energizing said motor to shift said shift element when the accelerator is moved to one of the limits of its movement, an electric switch connected with said motor and the shift element and adapted to be closed when the motor exerts a force to shift the element, electrically controlled means for substantially closing said throttle and connected with said switch and rendered operative when the switch is closed, and another switch connected in parallel with said first-named switch and actuated by said motor, said second-named switch being closed when the motor is in neutral condition whereby if the motor is temporarily inoperative after partially completing a shift of said element, said throttle closing means nevertheless remains operative.

34. In transmission mechanism, the combination of a drive shaft, a driven shaft, change speed gearing between said shafts, a shift element for said gearing for changing the speed ratio therethrough, a shift lever having a lost-motion connection with said shift element, a piston type fluid pressure differential motor connected with said shift lever for shifting said lever and element and being adapted to shift the element only part of the way from neutral to an engaged position thereof, spring detent means for completing the movement of said element to its said engaged position, and an electrical switch connected with said lever and element and being adapted to be closed when the lever is acted on by said motor for shifting said shift element and opened when the spring detent means is operative to complete the shift.

35. In transmission mechanism, the combination of a drive shaft, a driven shaft, an engine for driving said drive shaft and having a throttle, change speed gearing between said shafts, a shift element for said gearing for changing the speed ratio therethrough, a motor having a connection with the shift element for shifting the element, an electric switch connected with said motor and shift element and adapted to be closed when the motor exerts a force to shift the element, electrically controlled means for substantially closing said throttle and connected with said switch and rendered operative when the switch is closed, and another switch connected in parallel with said first-named switch and actuated by said motor, said second-named switch being closed when said motor is in neutral condition whereby if the motor is temporarily inoperative in such condition after partially completing a shift of said element, said throttle closing means nevertheless remains operative.

GEORGE E. FLINN.

REFERENCES CITED

The following references are of record in the file of this patent:

UNITED STATES PATENTS

| Number | Name | Date |
|---|---|---|
| 2,051,553 | Fleischel | Aug. 18, 1936 |
| 2,109,443 | Hill et al. | Feb. 22, 1938 |
| 2,129,259 | Boughton | Sept. 6, 1938 |
| 2,137,953 | Rowley | Nov. 22, 1938 |
| 2,192,078 | Hautzenroeder | Feb. 27, 1940 |
| 2,195,365 | Getaz | Mar. 26, 1940 |
| 2,227,879 | Dausch et al. | Jan. 7, 1941 |
| 2,229,907 | Velo | Jan. 28, 1941 |
| 2,252,009 | Kenny | Aug. 12, 1941 |
| 2,275,944 | Breese | Mar. 10, 1942 |
| 2,291,690 | Caves | Aug. 4, 1942 |
| 2,306,865 | Claytor | Dec. 29, 1942 |
| 2,322,479 | Schjolin | June 22, 1943 |
| 2,328,273 | Hale | Aug. 31, 1943 |
| 2,351,067 | Randol | June 13, 1944 |
| 2,360,976 | Peterson et al. | Oct. 24, 1944 |
| 2,373,259 | Price | Apr. 10, 1945 |
| 2,397,883 | Peterson et al. | Apr. 2, 1946 |